US 12,401,903 B2

(12) United States Patent
Mitsumori et al.

(10) Patent No.: US 12,401,903 B2
(45) Date of Patent: Aug. 26, 2025

(54) IMAGING APPARATUS, IMAGING APPARATUS CONTROL METHOD, AND PROGRAM

(71) Applicant: SONY GROUP CORPORATION, Tokyo (JP)

(72) Inventors: Ryo Mitsumori, Tokyo (JP); Jiro Kawano, Tokyo (JP); Mizuho Hara, Tokyo (JP); Ryosuke Takeuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 49 days.

(21) Appl. No.: 18/550,685

(22) PCT Filed: Jan. 24, 2022

(86) PCT No.: PCT/JP2022/002357
§ 371 (c)(1),
(2) Date: Sep. 15, 2023

(87) PCT Pub. No.: WO2022/201819
PCT Pub. Date: Sep. 29, 2022

(65) Prior Publication Data
US 2024/0196093 A1 Jun. 13, 2024

(30) Foreign Application Priority Data
Mar. 26, 2021 (JP) .................. 2021-054027

(51) Int. Cl.
*H04N 23/69* (2023.01)
*G06F 3/04845* (2022.01)
(Continued)

(52) U.S. Cl.
CPC ......... *H04N 23/69* (2023.01); *G06F 3/04845* (2013.01); *G06F 3/04847* (2013.01); *G06T 3/40* (2013.01)

(58) Field of Classification Search
CPC ...... H04N 23/69; H04N 23/45; H04N 23/631; H04N 23/633; H04N 23/634;
(Continued)

(56) References Cited

U.S. PATENT DOCUMENTS 10,674,072 B1 * 6/2020 Manzari ................. H04N 23/74
10,681,282 B1 * 6/2020 Manzari ............... H04N 5/2621
(Continued)

FOREIGN PATENT DOCUMENTS

EP 3736676 A1 11/2020
JP 2013-175855 A 9/2013
(Continued)

OTHER PUBLICATIONS

International Search Report and Written Opinion of PCT Application No. PCT/JP2022/002357, issued on Apr. 19, 2022, 08 pages of ISRWO.

*Primary Examiner* — Chiawei Chen
(74) *Attorney, Agent, or Firm* — CHIP LAW GROUP

(57) ABSTRACT

An operation portion (UI) that enables efficient execution of photographing lens selection processing by a user and digital zoom processing for a captured image using a selected lens is realized. A plurality of lenses with different lens magnifications available for image capturing, and a display control unit configured to execute control of display data to be output to a display unit are included, and the display control unit displays a plurality of lens selection portions corresponding to the plurality of respective lenses on the display unit, displays a digital zoom adjustment section in which a digital zoom amount of a captured image is adjustable
(Continued)

depending on a slide amount of the lens selection portion selected by a user, in response to a user operation for selecting one of the plurality of lens selection portions displayed on the display unit, and displays a digital zoom image executed depending on the slide amount on the display unit.

14 Claims, 34 Drawing Sheets

(51) Int. Cl.
*G06F 3/04847* (2022.01)
*G06T 3/40* (2024.01)

(58) Field of Classification Search
CPC ............ G06F 3/04845; G06F 3/04847; G06F 1/1686; G06F 3/0482; G06F 3/04817; G06F 3/04883; G06T 3/40; G03B 19/22; G03B 30/00
See application file for complete search history.

(56) References Cited

U.S. PATENT DOCUMENTS

| | | | | |
|---|---|---|---|---|
| 12,149,817 | B2 * | 11/2024 | Wang | H04N 23/635 |
| 2005/0057677 | A1 * | 3/2005 | Hagiwara | H04N 23/69 |
| | | | | 348/333.01 |
| 2005/0162534 | A1 * | 7/2005 | Higashiyama | H04N 23/69 |
| | | | | 348/240.1 |
| 2006/0170793 | A1 | 8/2006 | Pasquarette | |
| 2007/0025713 | A1 * | 2/2007 | Hosono | H04N 23/55 |
| | | | | 348/E5.025 |
| 2017/0134627 | A1 * | 5/2017 | Ikegami | H04N 23/667 |
| 2020/0267326 | A1 | 8/2020 | Yim | |
| 2020/0358963 | A1 * | 11/2020 | Manzari | H04N 23/633 |
| 2023/0076700 | A1 * | 3/2023 | Mitsumori | G06F 3/04883 |

FOREIGN PATENT DOCUMENTS

| | | |
|---|---|---|
| JP | 2015-076717 A | 4/2015 |
| JP | 2016134817 A | 7/2016 |
| JP | 2020-048202 A | 3/2020 |
| JP | 2021-040300 A | 3/2021 |
| KR | 980013284 A * | 4/1998 |

* cited by examiner

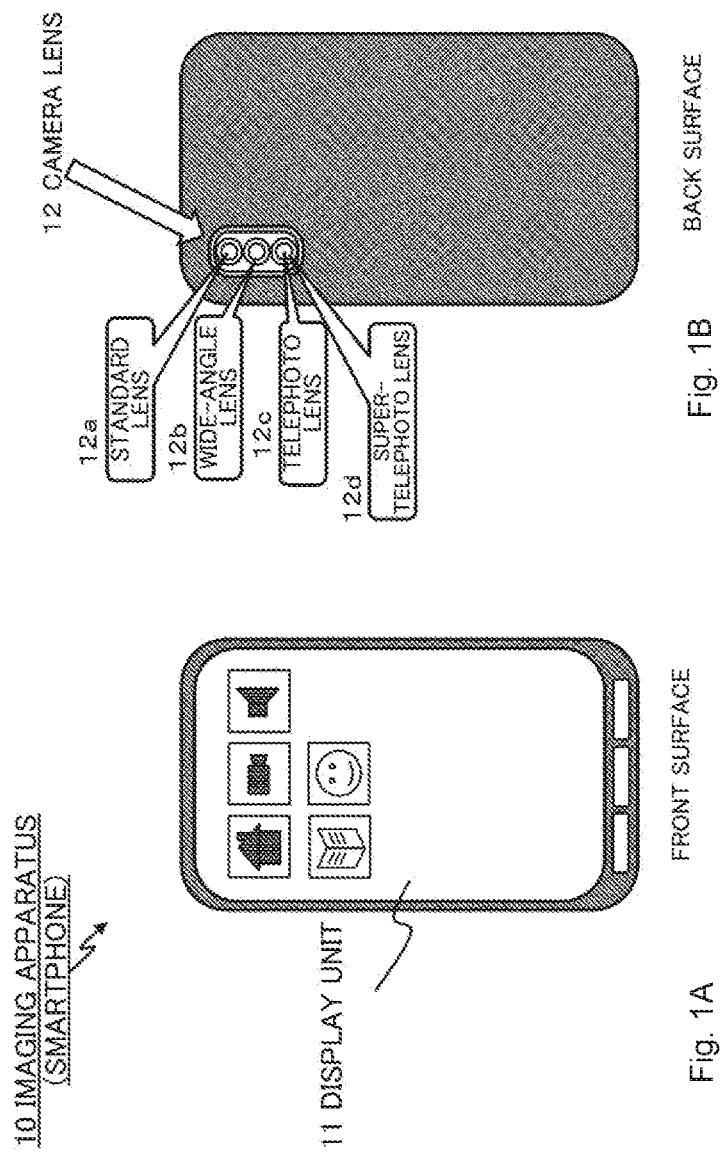

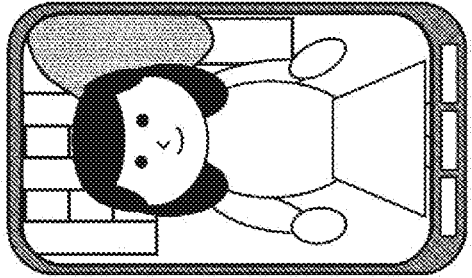
Fig. 2A Image captured using standard lens
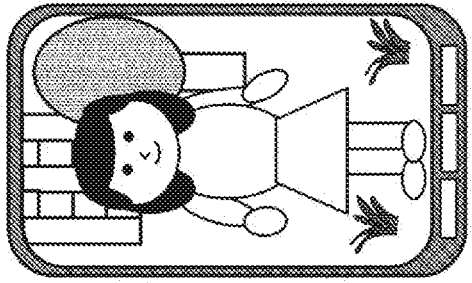
Fig. 2B Image captured using wide-angle lens
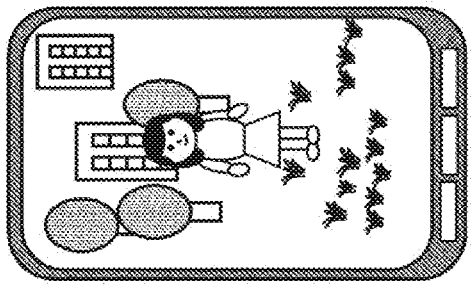
Fig. 2C Image captured using telephoto lens
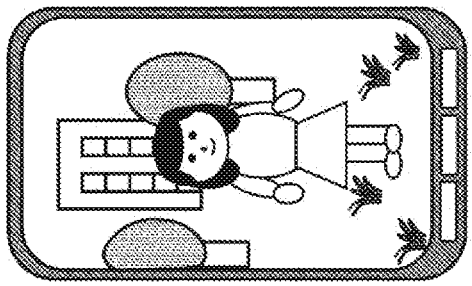
Fig. 2D Image captured using super-telephoto lens

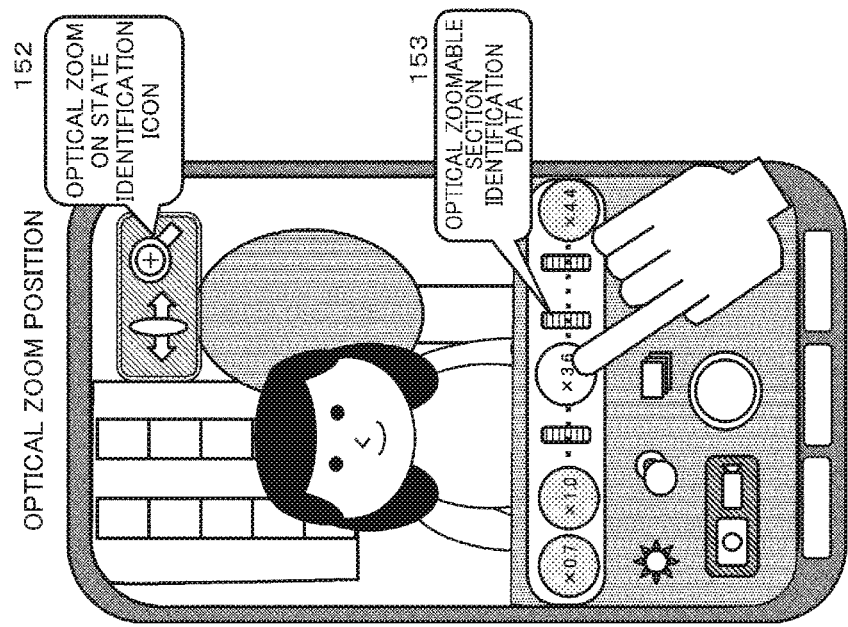
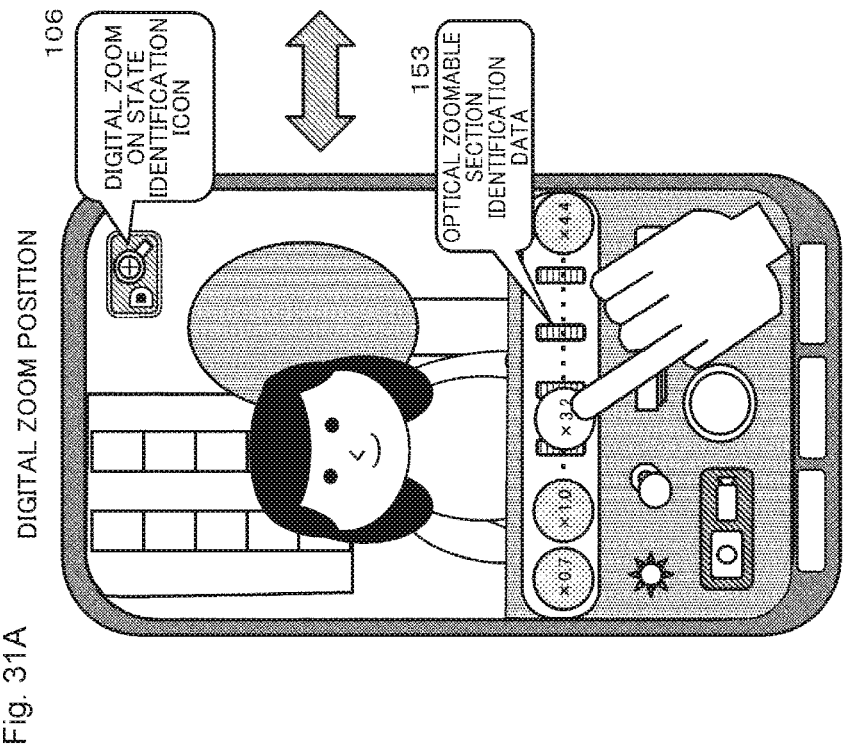
Fig. 31B  OPTICAL ZOOM POSITION
Fig. 31A  DIGITAL ZOOM POSITION

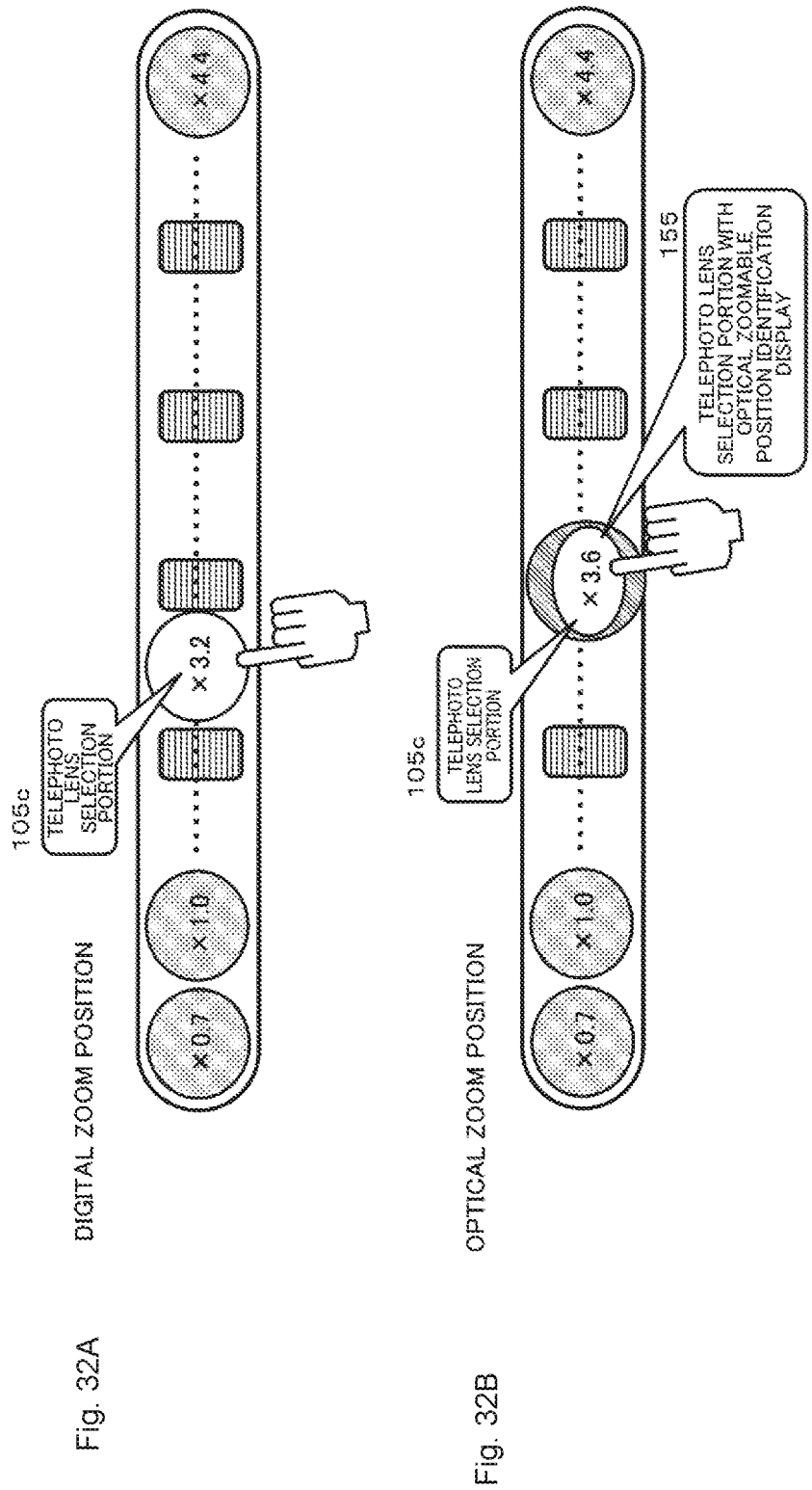

IMAGING APPARATUS, IMAGING APPARATUS CONTROL METHOD, AND PROGRAM

CROSS REFERENCE TO RELATED APPLICATIONS

This application is a U.S. National Phase of International Patent Application No. PCT/JP2022/002357 filed on Jan. 24, 2022, which claims priority benefit of Japanese Patent Application No. JP 2021-054027 filed in the Japan Patent Office on Mar. 26, 2021. Each of the above-referenced applications is hereby incorporated herein by reference in its entirety.

TECHNICAL FIELD

The present disclosure relates to an imaging apparatus, an imaging apparatus control method, and a program. More specifically, the present invention relates to an imaging apparatus that improves operability of switching between lenses used in the imaging apparatus and digital zoom processing, an imaging apparatus control method, and a program.

BACKGROUND ART

For example, many portable electronic devices such as smartphones have a camera function.

Especially in recent years, there has been an increase in the number of smartphones with a multi-lens camera including a plurality of different lenses, such as a wide-angle lens and a telephoto lens, in addition to a standard lens.

In the multi-lens camera, the lenses are switched therebetween depending on, for example, a distance to a subject and are used so that clearer images of both a distant subject and a nearby subject can be captured.

However, each of a standard lens, a wide-angle lens, and a telephoto lens mounted on a smartphone is a single focal length lens with a fixed focal length. Further, many thin apparatuses such as smartphones do not have a zoom lens. Therefore, for example, digital zoom processing is performed when an intermediate image between an image captured using a standard lens and an image captured using a telephoto lens is generated.

Digital zoom processing is performed as image enlargement processing for a captured image. For example, a portion of the image captured using the standard lens is cropped and enlarged so that it is possible to generate an intermediate image between an image captured using the standard lens and an image captured using the telephoto lens.

Digital zoom processing is described in, for example, PTL 1 (JP 2013-175855A).

When an image is captured using the smartphone including the multi-lens camera, a user first selects one of lenses to be used for capturing.

Through this lens selection processing, an image captured by the selected lens, that is, a so-called through image is displayed on a display unit of the smartphone. Further, when an angle of view or size of the image displayed on the display unit is adjusted, the user performs zoom processing using a digital zoom function, displays the image corrected by the digital zooming on the display unit, and sets the angle of view or size of the image to a desired value.

Thereafter, the user operates the shutter to perform photographing.

Thus, when photographing using the multi-lens camera is performed, the user is required to sequentially execute two processing including the lens selection processing and digital zoom processing.

However, in the case of most user interfaces (UIs) for a display of an operation portion of a smartphone, a lens selection UI and a digital zoom processing UI are configured as separate UIs. Therefore, when the user tries to perform digital zooming after selecting a lens, it is necessary to switch between the UIs, and there has often been a problem in that the user misses a photographing timing during this time.

CITATION LIST

Patent Literature

[PTL 1]
JP 2013-175855A

SUMMARY

Technical Problem

The present disclosure has been made, for example, in view of the above problems, and an object of the present disclosure is to provide an imaging apparatus in which the operability of switching of lenses used in the imaging apparatus, such as a smartphone, and digital zoom processing is improved, an imaging apparatus control method, and a program.

Solution to Problem

A first aspect of the present disclosure is an imaging apparatus including:
  a plurality of lenses available for image capture; and
  a display control unit configured to execute control of display data to be output to a display unit,
  wherein the display control unit
  displays a plurality of lens selection portions corresponding to the plurality of respective lenses on a display unit, and
  displays a digital zoom adjustment section in which a digital zoom amount of a captured image is adjustable depending on a slide amount of the lens selection portion selected by a user, in response to a user operation for selecting one of the plurality of lens selection portions displayed on the display unit.

Further, a second aspect of the present disclosure is
an imaging apparatus control method executed in an imaging apparatus,
wherein the imaging apparatus includes
a plurality of lenses available for image capture; and
a display control unit configured to execute control of display data to be output to a display unit,
wherein the display control unit
displays a plurality of lens selection portions corresponding to the plurality of respective lenses on a display unit, and
displays a digital zoom adjustment section in which a digital zoom amount of a captured image is adjustable depending on a slide amount of the lens selection portion selected by a user, in response to a user operation for selecting one of the plurality of lens selection portions displayed on the display unit.

Further, a third aspect of the present disclosure is
a program for causing imaging apparatus control processing to be executed in an imaging apparatus,
a plurality of lenses available for image capture; and
a display control unit configured to execute control of display data to be output to a display unit, and
the program causes the display control unit to execute
processing for displaying a plurality of lens selection portions corresponding to the plurality of respective lenses on a display unit, and
processing for displaying a digital zoom adjustment section in which a digital zoom amount of a captured image is adjustable depending on a slide amount of the lens selection portion selected by a user, in response to a user operation for selecting one of the plurality of lens selection portions displayed on the display unit.

The program of the present disclosure is, for example, a program that can be provided to an information processing apparatus or a computer system capable of executing various program codes, in a computer-readable format by a storage medium or communication medium. When such a program is provided in a computer-readable format, processing according to the program is realized on the information processing apparatus or computer system.

Still other objects, characteristics, and advantages of the present disclosure will become apparent from more detailed description based on embodiments of the present disclosure or the accompanying drawings, which will be described below. In the present specification, the system is a logical collective configuration of a plurality of devices, and the devices of the respective configuration are not limited to being in the same housing.

According to the configuration of the embodiment of the present disclosure, the operation portion (UI) that enables efficient execution of the photographing lens selection processing by the user and the digital zoom processing for the captured image using the selected lens is realized.

Specifically, for example, a plurality of lenses with different lens magnifications available for image capturing, and a display control unit configured to execute control of display data to be output to a display unit are included, and the display control unit displays a plurality of lens selection portions corresponding to the plurality of respective lenses on the display unit, displays a digital zoom adjustment section in which a digital zoom amount of a captured image is adjustable depending on a slide amount of the lens selection portion selected by a user, in response to a user operation for selecting one of the plurality of lens selection portions displayed on the display unit, and displays a digital zoom image executed depending on the slide amount on the display unit.

With this configuration, the operation portion (UI) that enables efficient execution of the photographing lens selection processing by the user and the digital zoom processing for the captured image using the selected lens is realized.

The effects described in the present specification are merely examples and are not limited, and there may be additional effects.

BRIEF DESCRIPTION OF DRAWINGS

FIGS. 1A and 1B are diagrams illustrating an example of an external appearance configuration of an imaging apparatus.

FIGS. 2A, 2B, 2C, and 2D are diagrams illustrating an example of an image captured by lens switching.

FIGS. 21A, 21B, and 12C are diagrams illustrating a specific example of display data for notifying the user of deterioration of image quality due to the digital zoom processing.

FIGS. 31A and 31B are diagrams illustrating an example of display data of an example unit (UI portion) in an apparatus capable of optical zooming.

FIGS. 32A and 32B are diagrams illustrating an example of display data of an example unit (UI portion) in an apparatus capable of optical zooming.

DESCRIPTION OF EMBODIMENTS

Figure 3:
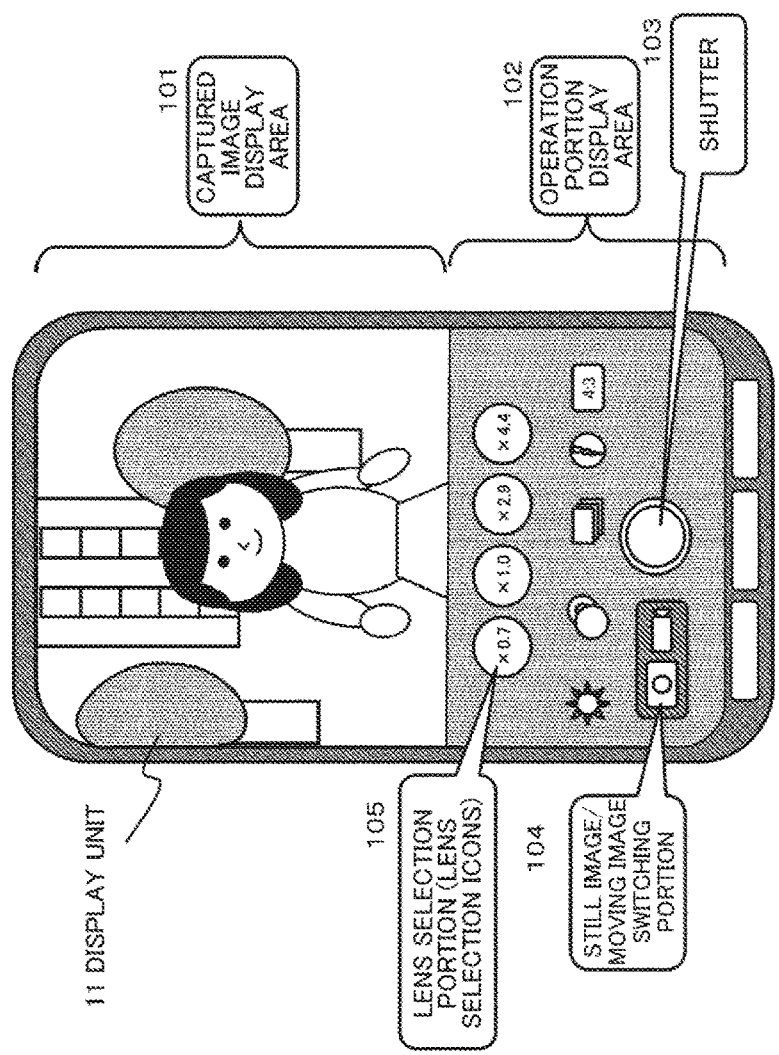
FIG. 3 is a diagram illustrating an example of display data on a display unit of the imaging apparatus.

Hereinafter, details of the imaging apparatus, the imaging apparatus control method, and the program according to the present disclosure will be described with reference to the drawings. Description will be made according to the following items.

1. Overview of Configuration of Imaging Apparatus of Present Disclosure and Lens Switching Processing
2. Operation Portion Display Control Processing Executed in Imaging Apparatus of Present Disclosure
3. Operation Portion UI Display Control Processing Sequence Executed by Imaging Apparatus of Present Disclosure
4. Display Control Processing for Notifying User of Image Quality Degradation Due to Digital Zoom
5. Other Examples of Display Control Processing
6. Configuration Example of Imaging Apparatus of Present Disclosure
7. Hardware Configuration Example of Imaging Apparatus
8. Conclusion of Configuration of Present Disclosure 1. OVERVIEW OF CONFIGURATION OF IMAGING APPARATUS OF PRESENT DISCLOSURE AND LENS SWITCHING PROCESSING First, an overview of a configuration of the imaging apparatus of the present disclosure and lens switching processing will be described.

FIGS. 1A and 1B are diagrams illustrating a configuration example of an imaging apparatus of the present disclosure. In FIGS. 1A and 1B, a smartphone having a camera function is illustrated as an example of an imaging apparatus 10 of the present disclosure.

The imaging apparatus of the present disclosure is not limited to such a smartphone, and includes, for example, a tablet terminal having a camera function, a PC, and an imaging apparatus such as a camera.

FIG. 1A illustrates a front side of the imaging apparatus (smartphone) 10, in which a display unit 11 is provided. FIG. 1B illustrates a back side of the imaging apparatus (smartphone) 10, in which a camera lens 12 is provided.

The camera lens 12 is configured of a plurality of lenses with different focal lengths. That is, the imaging apparatus 10 illustrated in FIGS. 1A and 1B are smartphones including the multi-lens camera.

The user can select a lens to be used from among the plurality of lenses at the time of capturing an image, and appropriately perform switching processing to clearly photograph subjects at various distances.

The imaging apparatus (smartphone) 10 illustrated in FIGS. 1A and 1B include the following four types of lenses.

(a) Standard lens 12a
(b) Wide-angle lens 12b
(c) Telephoto lens 12c
(d) Super-telephoto lens 12d In the figure, the telephoto lens 12c and the super-telephoto lens 12d are shown in one lens portion at a bottom of the camera lens 12, but two lenses including the telephoto lens 12c and the super-telephoto lens 12d are incorporated in this lens portion at the bottom.

(a) The standard lens 12a is a lens with a focal length of 24 mm and a lens magnification of 1.0 times.
(b) The wide-angle lens 12b is a lens with a focal length of 16 mm and a lens magnification of 0.7 times.
(c) The telephoto lens 12c is a lens with a focal length of 70 mm and a lens magnification of 2.9 times.
(d) The super-telephoto lens 12d is a lens with a focal length of 105 mm and a lens magnification of 4.4 times.

A user of the imaging apparatus 10 can switch between these lenses 12a to 12d to perform photographing at the time of image capturing.

The focal length and the lens magnification of each lens are examples, and the processing of the present disclosure can also be applied to an apparatus configuration including various lenses having other focal lengths and lens magnifications.

Further, the lens type is also an example, and the lens type is not limited to four types, and the configuration of the present disclosure is also applicable to configurations including two, three, four, five, six, and more types of lenses.

FIGS. 2A, 2B, 2C, and 2D illustrate an example of images captured by switching between the lenses FIGS. 2A, 2B, 2C, and 2D.

In FIGS. 2A, 2B, 2C, and 2D, examples of the following four types of captured images are illustrated.

FIG. 2A Image captured using standard lens
FIG. 2B Image captured using wide-angle lens
FIG. 2C Image captured using telephoto lens
FIG. 2D Image captured using super-telephoto lens FIG. 2A The image captured using the standard lens is an image captured using the standard lens 12a with a focal length of 24 mm and a lens magnification of 1.0 times.

FIG. 2B The image captured using the wide-angle lens is an image captured using the wide-angle lens 12b with a focal length of 16 mm and a lens magnification of 0.7 times.

FIG. 2C The image captured using the telephoto lens is an image captured using a telephoto lens 12c with a focal length of 70 mm and a lens magnification of 2.9 times.

FIG. 2D The image captured using super-telephoto lens is an image captured using the super-telephoto lens 12d with a focal length of 105 mm and a lens magnification of 4.4 times.

As can be understood from FIGS. 2A, 2B, 2C, and 2D, FIG. 2B the image captured using the wide-angle lens is an image captured using the widest field of view, and an order of the width of fields of view is an order of FIG. 2B the image captured using the wide-angle lens, FIG. 2A the image captured using the standard lens, FIG. 2C the image captured using the telephoto lens, and FIG. 2D the image captured using the super-telephoto lens.

Meanwhile, when sizes of subjects at the same distance at a distance are compared with each other, FIG. 2D the image captured using the super-telephoto lens is the largest. The order of sizes of the subject at the same distance is reverse to order of fields of view, as in FIG. 2D the image captured using the super-telephoto lens, FIG. 2C the image captured using the telephoto lens, FIG. 2A the image captured using the standard lens, and FIG. 2B the image captured using the wide-angle lens.

Thus, with the multi-lens camera, it is possible to capture various images by switching between lenses to be used.

2. OPERATION PORTION DISPLAY CONTROL PROCESSING EXECUTED IN IMAGING APPARATUS OF PRESENT DISCLOSURE

Next, operation portion display control processing executed in the imaging apparatus of the present disclosure will be described.

FIG. 3 is a diagram illustrating an example of an operation portion serving as a user interface (UI) displayed on the display unit 11 of the imaging apparatus (smartphone) 10.

An upper part of the display unit 11 is set as a captured image display area 101, and a lower part thereof is set as an operation portion display area 102.

The image displayed in the captured image display area 101 is not limited to an image subjected to capturing processing and also includes an image before capturing. A so-called through image, that is, an image that the user is about to capture is also displayed in the captured image display area 101. The user operates operation portions such as various icons displayed in the operation portion display area 102 to capture an image while viewing the image displayed in the captured image display area 101.

In the operation portion display area 102 illustrated in FIG. 3, icons as various operation portions such as a shutter 103, a still image/moving image switching portion 104, and a lens selection portion 105 are displayed. Information on the operation portions (icons) displayed in the operation portion display area 102 can be switched to various settings.

When an image displayed in the captured image display area 101 is captured, the user touches the shutter 103. Through this processing, the image displayed in the captured image display area 101 is captured and recorded in a memory.

The still image/moving image switching portion 104 is an operation portion for switching between a still image and a moving image as a captured image.

The processing of the present disclosure can be applied to both still image capturing processing and moving image capturing processing. However, in the following embodiments, a processing example in the case of capturing a still image will be described as a representative example.

The lens selection portion 105 is an operation portion for switching between the lenses that are used for image capturing, and four lens selection icons for individually selecting the four types of lenses described above with reference to FIGS. 1A and 1B are displayed.

FIG. 3 illustrates the following four lens selection portions (lens selection icons).

Wide-angle lens selection portion (×0.7)
Standard lens selection portion (×1.0)
Telephoto lens selection portion (×2.9)
Super-telephoto lens selection portion (×4.4)

Numerical values (0.7 to 4.4) within the respective icons indicate the magnifications of the respective lenses.

The user can perform switching to a lens to be used, by operating (touching) one of the four lens selection portions (lens selection icons).

FIGS. 4A, 4B, 4C, and 4D are diagrams illustrating an example of display images switched depending on a user operation (touch) with respect to the four lens selection portions (lens selection icons), that is, an example of switching between the display images in the captured image display area 101.

FIGS. 4A, 4B, 4C, and 4D illustrate examples of the following four types of user operation states.

Figure 4:
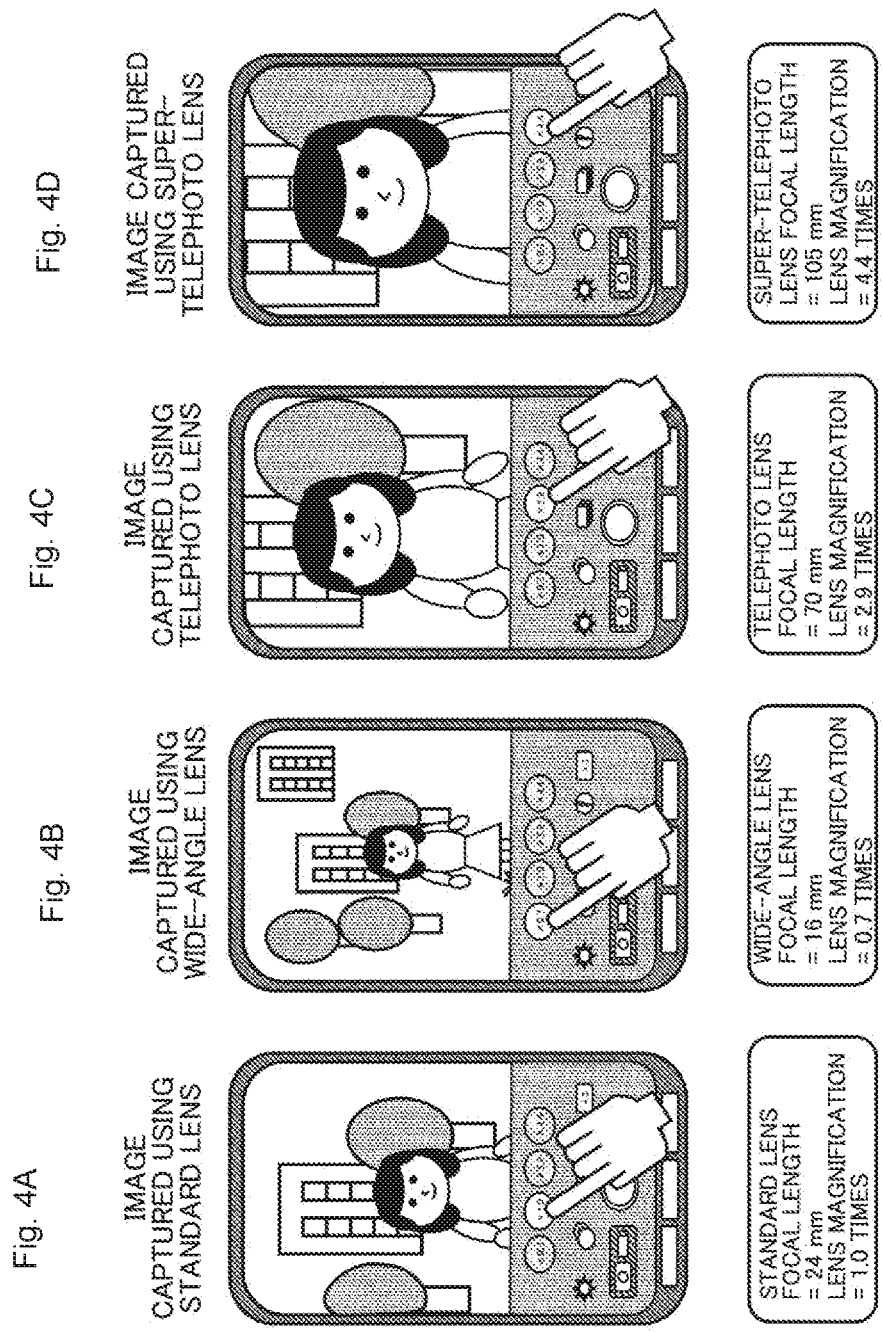
FIGS. 4A, 4B, 4C, and 4D are diagrams illustrating an example of a captured image and display data according to a user operation with respect to a lens selection portion (lens selection icon).

FIG. 4A A state in which the user operates (touches) the standard lens selection portion (standard lens selection icon)
FIG. 4B A state in which the user operates (touches) the wide-angle lens selection portion (wide-angle lens selection icon)
FIG. 4C A state in which the user operates (touches) the telephoto lens selection portion (telephoto lens selection icon)
FIG. 4D A state in which the user operates (touches) the super-telephoto lens selection portion (super-telephoto lens selection icon)

As illustrated in FIG. 4A, when the user operates (touches) the standard lens selection portion (standard lens selection icon), processing of switching a photographing lens to the standard lens 12a is executed inside the imaging apparatus 10, and the image (through image) captured using the standard lens 12a is displayed on the display unit 11.

Further, as illustrated in FIG. 4B, when the user operates (touches) the wide-angle lens selection portion (wide-angle lens selection icon), processing of switching the photographing lens to the wide-angle lens 12b is executed inside the imaging apparatus 10, and the image (through image) captured using the wide-angle lens 12b is displayed on the display unit 11.

Further, as illustrated in FIG. 4C, when the user operates (touches) the telephoto lens selection portion (telephoto lens selection icon), processing of switching the photographing lens to the telephoto lens 12c is executed inside the imaging apparatus 10, and the image (through image) captured using the telephoto lens 12c is displayed on the display unit 11.

Further, as illustrated in FIG. 4D, when the user operates (touches) the super-telephoto lens selection portion (super-telephoto lens selection icon), processing of switching the photographing lens to the super-telephoto lens 12d is executed inside the imaging apparatus 10, and the image (through image) captured using the super-telephoto lens 12d is displayed on the display unit 11.

Thus, the user performs an operation (touch) for selecting one lens selection icon from among the lens selection portions (lens selection icons) 105 in the operation portion (UI), so that it becomes possible to display the image captured using the selected lens on the display unit 11.

Then, the shutter 103 is touched so that it is possible to capture the image displayed on the display unit 11 and record the image in the memory.

However, images captured by selecting the respective lens selection portions (lens selection icons) 105 in the operation portion (UI) are only four types of images according to four types of magnifications such as magnifications (0.7 times, 1.0 times, 2.9 times, and 4.4 times) of the respective lenses.

For example, the image captured using the standard lens illustrated in FIG. 4A is an image captured according to the lens magnification (1.0 times) unique to the standard lens.

Further, the image captured using the telephoto lens illustrated in FIG. 4C is an image captured according to a lens magnification (2.9 times) unique to the telephoto lens.

When it is desired to capture an intermediate image between the image captured using the standard lens illustrated in FIG. 4A and the image captured using the telephoto lens illustrated in FIG. 4C, it is necessary to perform digital zoom processing.

Digital zoom processing is performed as image enlargement processing for a captured image. For example, a portion of the image captured using the standard lens is cropped and enlarged so that it is possible to generate an intermediate image between the image captured using the standard lens and the image captured using the telephoto lens.

A specific example of a user operation when digital zoom processing is performed in the imaging apparatus 10 of the present disclosure will be described below.

FIGS. 5 to 12 illustrate a series of operation examples of the user who operates the imaging apparatus 10.

Figure 5:
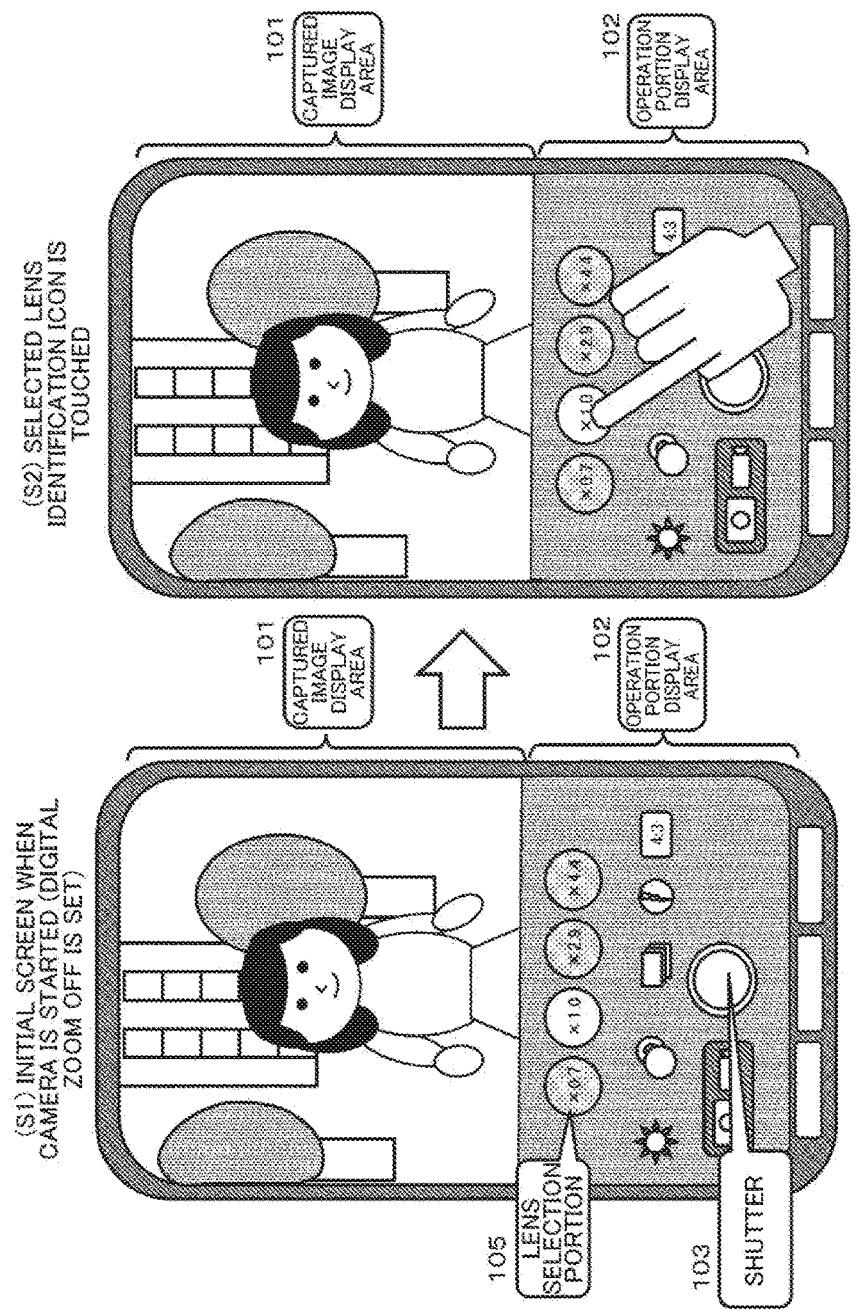
FIG. 5 is a diagram illustrating an example of a series of operations by a user who operates the imaging apparatus and an example of transition of display data according to the user operation.
Figure 12:
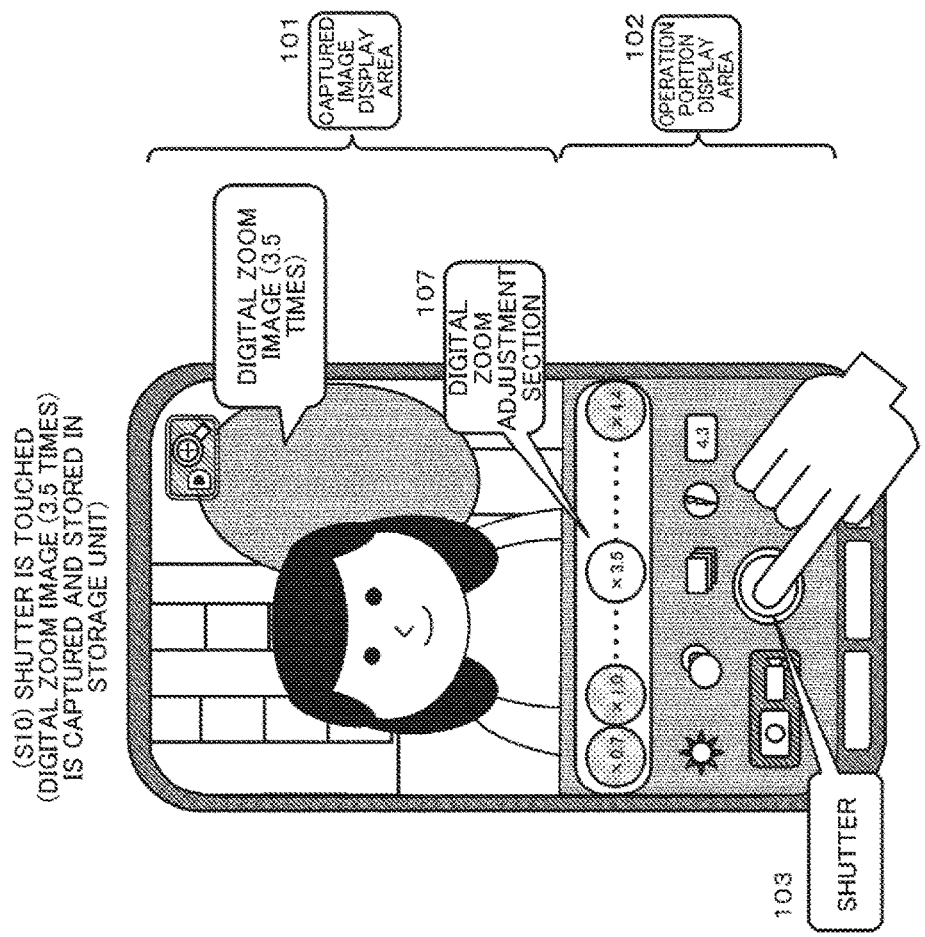
FIG. 12 is a diagram illustrating an example of a series of operations by a user who operates the imaging apparatus and an example of transition of display data according to the user operation.

Depending on the user operation, display states of the display unit 11 of the imaging apparatus 10 sequentially transition from (step S1) in FIG. 5 to (step S10) in FIG. 12.

Hereinafter, display data on the display unit 11 and a user operation in each step will be described.

(Step S1)

The display data shown in step S1 of FIG. 5 is an initial screen when the camera is started.

The standard lens 12a is selected by default when the camera is started.

An image captured using the standard lens 12 is displayed in the captured image display area 101.

In the lens selection portion (lens selection icon) 105 of the operation portion display area 102, only a standard lens selection icon (1.0) is displayed with higher brightness or different color than or from other lens selection icons (0.7, 2.9, and 4.4) to show that the standard lens 12a is selected.

When the user confirms the image displayed in the captured image display area 101, that is, the image captured using the standard lens 12 with a lens magnification of 1.0 times, and determines to capture and record this image, the user touches the shutter 103.

However, for example, when a person is desired to be photographed a little larger, digital zoom is performed. Processing in this case is (step S2) and subsequent processing.

(Step S2)

Step S2 in FIG. 5 is processing when the user wants to photograph a person a little larger and starts digital zooming.

In this case, the user touches the lens selection icon for the standard lens 12a with the lens magnification of 1.0 times, which is a lens selection portion (lens selection icon) of a currently selected lens, and performs processing for sliding this icon.

A specific sequence of lens selection icon slide processing will be described with reference to FIG. 6 and subsequent figures.

(Step S3)

Figure 6:
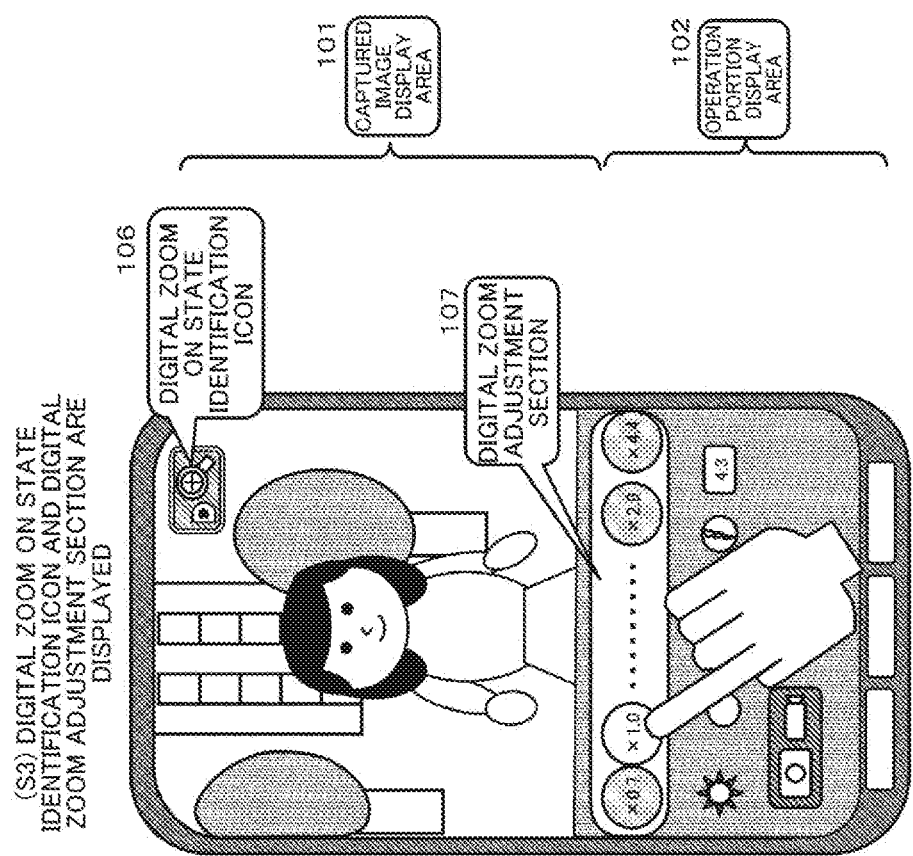
FIG. 6 is a diagram illustrating an example of a series of operations by a user who operates the imaging apparatus and an example of transition of display data according to the user operation.

When the user operates (touches) the lens selection icon for the standard lens 12a with the lens magnification of 1.0 times, the data processing unit inside the imaging apparatus 10 displays a digital zoom ON state identification icon 106 and a digital zoom adjustment section 107, as illustrated in FIG. 6, according to icon touch processing.

The digital zoom ON state identification icon 106 is an icon for notifying the user of a setting indicating that the digital zoom processing is possible.

The digital zoom adjustment section 107 is an area in which the lens selection icon is slidable, and is a section in which a digital zoom amount can be set.

The user can set the digital zoom amount by sliding the touched lens selection icon within the digital zoom adjustment section 107.

The user touches the lens selection icon for the standard lens 12a with lens magnification of 1.0 times and slides the lens selection icon for the standard lens 12a within the digital zoom adjustment section. With this slide processing, it is possible to adjust the digital zoom amount for the image captured using the standard lens 12a with a lens magnification of 1.0 times, which is the selected lens. Processing for adjusting this digital zoom amount will be described with reference to FIG. 7 and subsequent drawings.

(Step S4)

Figure 7:
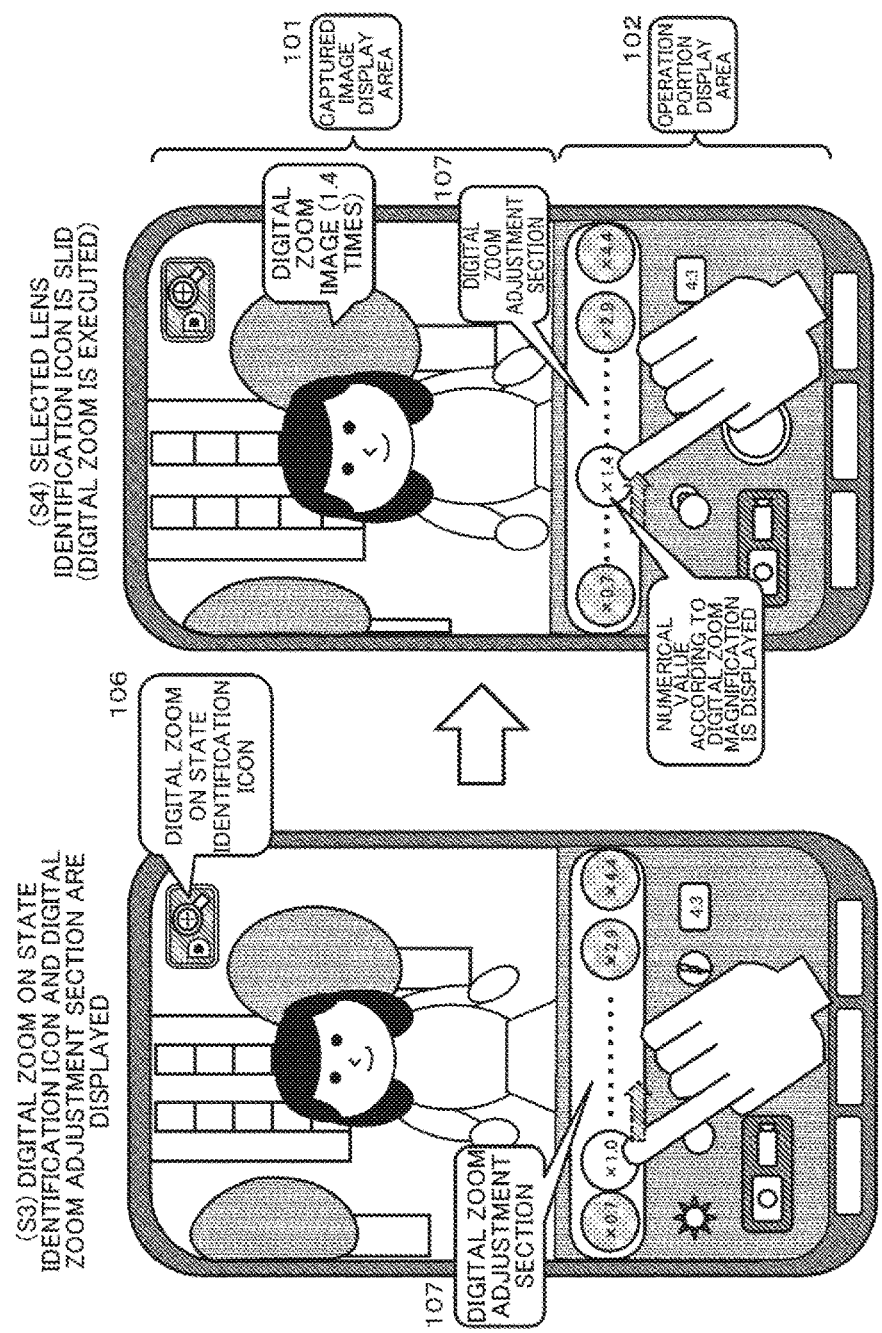
FIG. 7 is a diagram illustrating an example of a series of operations by a user who operates the imaging apparatus and an example of transition of display data according to the user operation.

FIG. 7 illustrates display data of (step S3) described with reference to FIG. 6, and display data of subsequent (step S4).

In the display data of (step S3), the digital zoom ON state identification icon 106 and the digital zoom adjustment section 107 are displayed in response to the user touching the lens selection icon for the standard lens 12a with the lens magnification of 1.0 times.

Thereafter, the user slides the touched lens selection icon for the standard lens 12a with the lens magnification of 1.0 times to the right within the digital zoom adjustment section 107.

That is, the lens selection icon for the standard lens 12a with a lens magnification of 1.0 times is slid (moved) toward a lens selection icon for the telephoto lens 12c with the lens magnification of 2.9 times.

According to this slide processing, the numerical value displayed on the lens selection icon for the standard lens 12a with the lens magnification of 1.0 times is changed.

In (step S4) of FIG. 7, the lens selection icon for the standard lens 12a with the lens magnification of 1.0 times touched by the user is slid to the right, and (×1.4) is displayed on the icon at this position.

This indicates that digital zoom processing for enlarging the image captured using the standard lens 12a with a lens magnification of 1.0 times to an image corresponding to an image captured using a lens with a lens magnification of 1.4 times is performed.

A digital zoom image of the image captured using the standard lens 12a having a lens magnification of 1.0 times touched by the user is displayed in the captured image display area 101. That is, an image corresponding to the image captured using the lens with a lens magnification of 1.4 times is displayed.

The data processing unit of the imaging apparatus executes image correction processing for the image captured by the standard lens 12a with the lens magnification of 1.0 times depending on a slide amount of the lens selection icon slid by the user. The data processing unit of the imaging apparatus executes processing for correcting the captured image, that is, processing for extracting a partial area from the captured image and processing for enlarging an extracted image as digital zoom processing, and displays an image after the enlarging processing in the captured image display area 101.

The image displayed in the captured image display area of (step S4) in FIG. 7 is an image subjected to this digital zoom processing.

That is, the image is an image generated by executing the digital zoom processing for extracting a partial area from the image captured by the standard lens 12a with a lens magnification of 1.0 times, which is the image displayed in the captured image display area (step S3) in FIG. 7 and enlarging the extracted image. This image corresponds to the image captured using the lens with the lens magnification of 1.4 times.

When the user confirms the image displayed in the captured image display area 101, that is, the same digital zoom image as the image captured using the lens with the lens magnification of 1.4 times and determines that the user desires to record this image, the user touches the shutter 103.

However, for example, when a person is desired to be photographed a little larger, digital zoom is also performed. Processing in this case is (step S5) and subsequent processing.

(Step S5)

Figure 8:
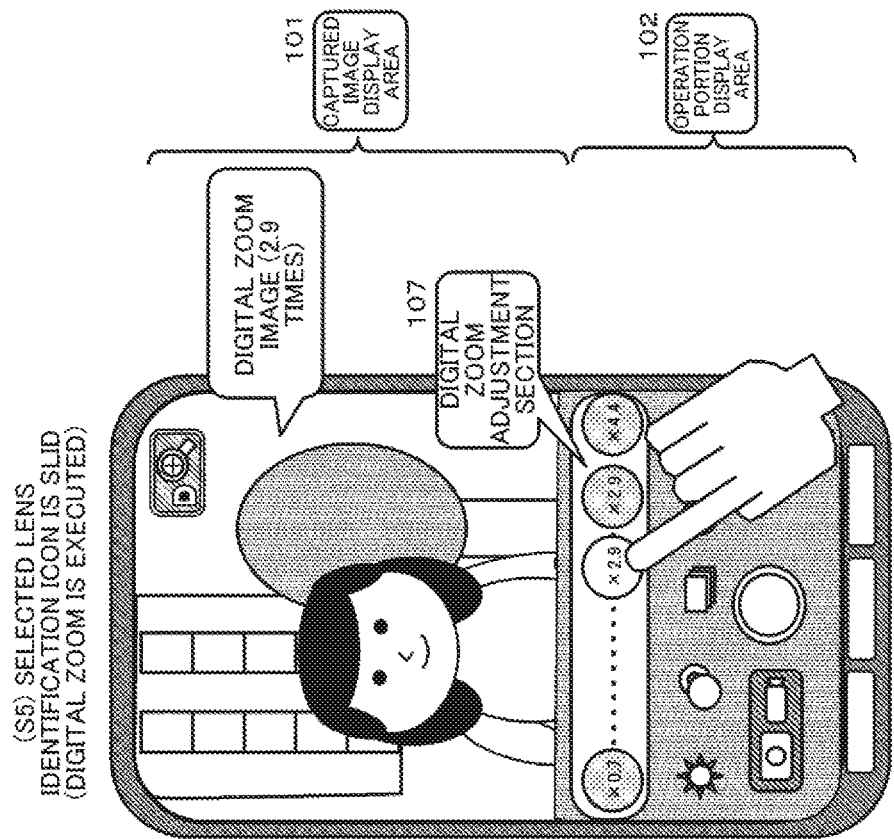
FIG. 8 is a diagram illustrating an example of a series of operations by a user who operates the imaging apparatus and an example of transition of display data according to the user operation.

The display data illustrated in FIG. 8 shows a state in which the user has slid the lens selection icon for the standard lens 12a with a lens magnification of 1.0 times to the right within the digital zoom adjustment section 107.

That is, the lens selection icon for the standard lens 12a with a lens magnification of 1.0 times is slid (moved) to be closer to the lens selection icon for the telephoto lens 12c with the lens magnification of 2.9 times.

According to this slide processing, the numerical value displayed on the lens selection icon for the standard lens 12a with the lens magnification of 1.0 times is further changed.

In (step S5) of FIG. 8, the lens selection icon for the standard lens 12a with the lens magnification of 1.0 times touched by the user is further slid to the right, and (×2.9) is displayed on the icon at this position.

This indicates that digital zoom processing for enlarging the image captured using the standard lens 12a with a lens magnification of 1.0 times to an image corresponding to an image captured using a lens with a lens magnification of 2.9 times is performed.

A digital zoom image of the image captured using the standard lens 12a having a lens magnification of 1.0 times touched by the user is displayed in the captured image display area 101. That is, an image corresponding to an image captured using the lens with the lens magnification of 2.9 times is displayed.

As described above, the data processing unit of the imaging apparatus executes image correction processing for the image captured by the standard lens 12a with the lens magnification of 1.0 times depending on a slide amount of the lens selection icon slid by the user.

In (step S5) of FIG. 8, a slide amount of the lens selection icon is larger than that of (step S4) in FIG. 7, and the data processing unit of the imaging apparatus performs digital zoom processing according to the slide amount. Here, an enlarged image corresponding to the image captured using the lens with the lens magnification of 2.9 times is generated.

The image displayed in the captured image display area of (step S5) in FIG. 8 is the image subjected to this digital zoom processing, and corresponds to the image captured using the lens with the lens magnification of 2.9 times.

(Step S6)

Figure 9:
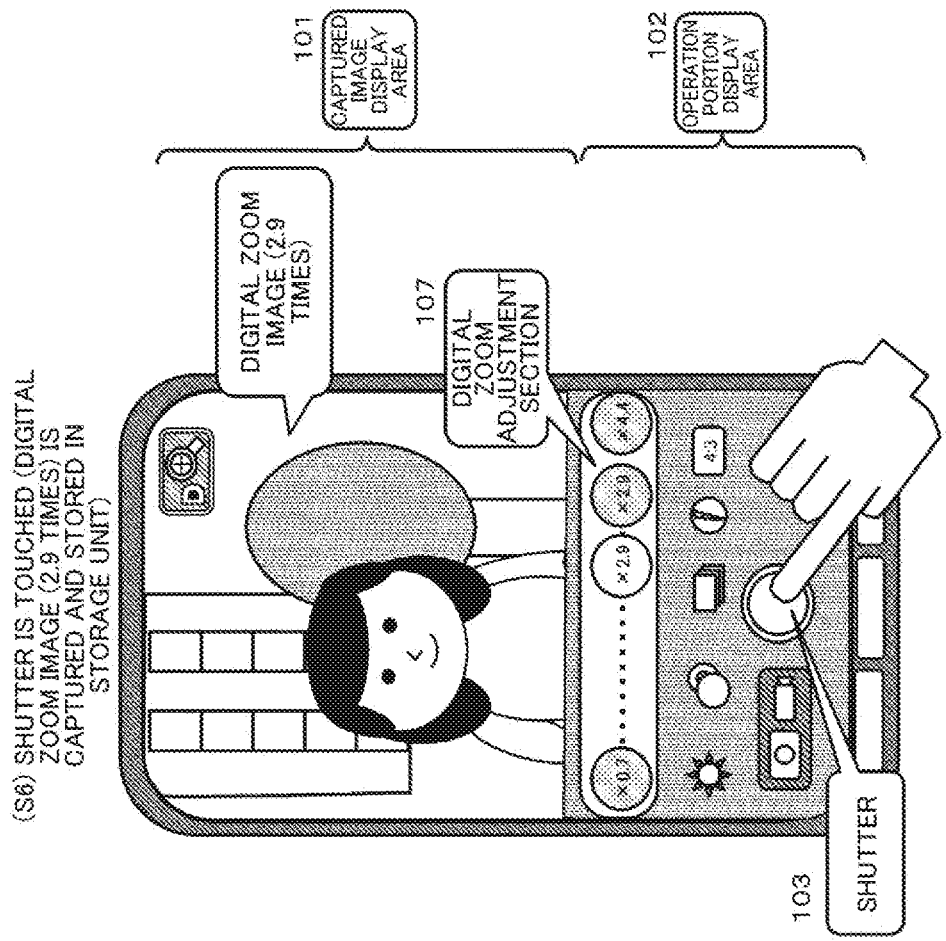
FIG. 9 is a diagram illustrating an example of a series of operations by a user who operates the imaging apparatus and an example of transition of display data according to the user operation.

(Step S9) illustrated in FIG. 9 is a diagram illustrating a user operation when a determination is made that the user desires to record the image displayed in the captured image display area 101.

The image displayed in the captured image display area 101 of the display unit 11 of the imaging apparatus in (step S9) illustrated in FIG. 9 is the image displayed in (step S5) described with reference to FIG. 8.

That is, this is the digital zoom processing image for the image captured using the standard lens with a lens magnification of 1.0 times. This image is the same as the image captured using the lens with the lens magnification of 2.9 times.

The user confirms this displayed image and touches the shutter 103 when the user determines that the user desires to record this image.

Through this touch processing, processing for capturing the image displayed in the captured image display area 101 is executed, and the image is recorded in the memory.

The image recorded in the memory is the digital zoom processing image of the image captured using the standard lens with a lens magnification of 1.0 times.

Further, when the user wants to capture an image in which a face of the person is larger, the user performs lens switching.

As illustrated in FIG. 9, the lens selection icon selected and slid by the user is in contact with an adjacent lens selection icon (×2.9) with a lens magnification of 2.9 times within the digital zoom adjustment section 107, and cannot further slide to the right.

Therefore, when the user is desired to capture the image in which a face of the person is larger, the user performs lens switching.

This processing will be described with reference to FIG. 10.

(Step S7)

When the user captures the digital zoom processing image (an image corresponding to the lens magnification of 2.9 times) for the image captured using the standard lens with a lens magnification of 1.0 times in (step S6) illustrated in FIG. 9, and then, desires to capture the image in which a face of the person is larger, the user performs lens switching.

Figure 10:
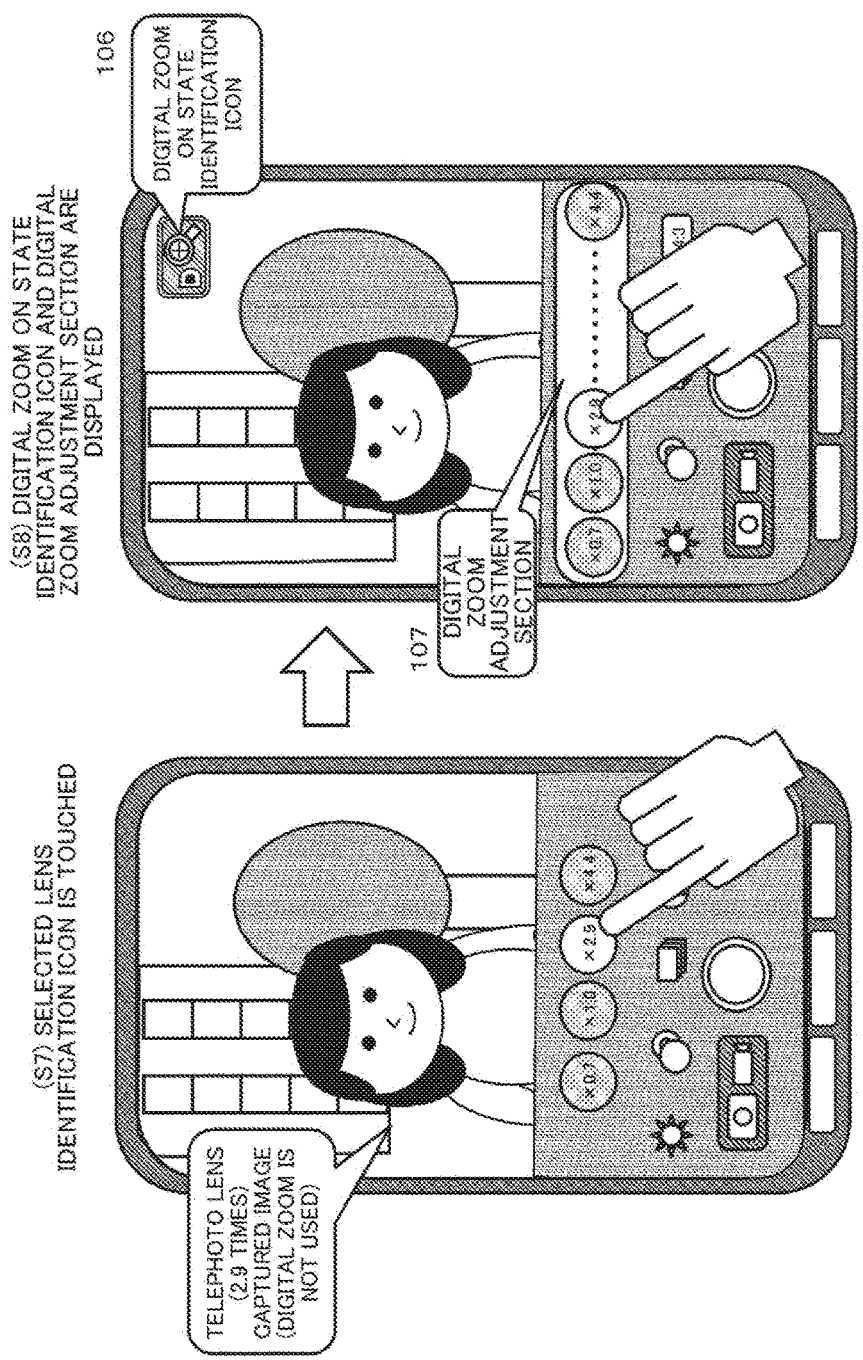
FIG. 10 is a diagram illustrating an example of a series of operations by a user who operates the imaging apparatus and an example of transition of display data according to the user operation.

As illustrated in FIG. 10 (step S7), the user takes away the finger from the lens selection icon for the standard lens 12a with the lens magnification of 1.0 times that has been subjected to the slide processing, and touches the adjacent lens selection icon for the telephoto lens 12c with the lens magnification of 2.9 times.

When the user takes away the finger from the lens selection icon for the standard lens 12a with the lens magnification of 1.0 times that has been subjected to the slide processing, the digital zoom ON adjustment icon 106 and the digital zoom adjustment section 107 are not displayed.

Thereafter, the user touches the lens selection icon for the telephoto lens 12c with the lens magnification of 2.9 times. (Step S8)

The display data of (step S8) illustrated in FIG. 10 is display data after the user touches the lens selection icon for the telephoto lens 12c with the lens magnification of 2.9 times.

When the user touches the lens selection icon for the telephoto lens 12c with the lens magnification of 2.9 times, the data processing unit inside the imaging apparatus 10 displays the digital zoom ON state identification icon 106 and the digital zoom adjustment section 107, as illustrated in FIG. 10 (step S8), according to detection of the icon touch processing.

The digital zoom ON state identification icon 106 is an icon for notifying the user of a setting indicating that the digital zoom processing is possible.

The digital zoom adjustment section 107 is an area in which the lens selection icon is slidable, and is a section in which the digital zoom amount can be set.

The user can set the digital zoom amount by sliding the touched lens selection icon within the digital zoom adjustment section 107.

The user touches the lens selection icon for the telephoto lens 12c with the lens magnification of 2.9 times and slides the lens selection icon within the digital zoom adjustment section. With this slide processing, it is possible to adjust the digital zoom amount for the image captured using the telephoto lens 12c with the lens magnification of 2.9 times, which is the selected lens.

This processing for adjusting the digital zoom amount will be described with reference to FIG. 11 and subsequent figures.

(Step S9)

Figure 11:
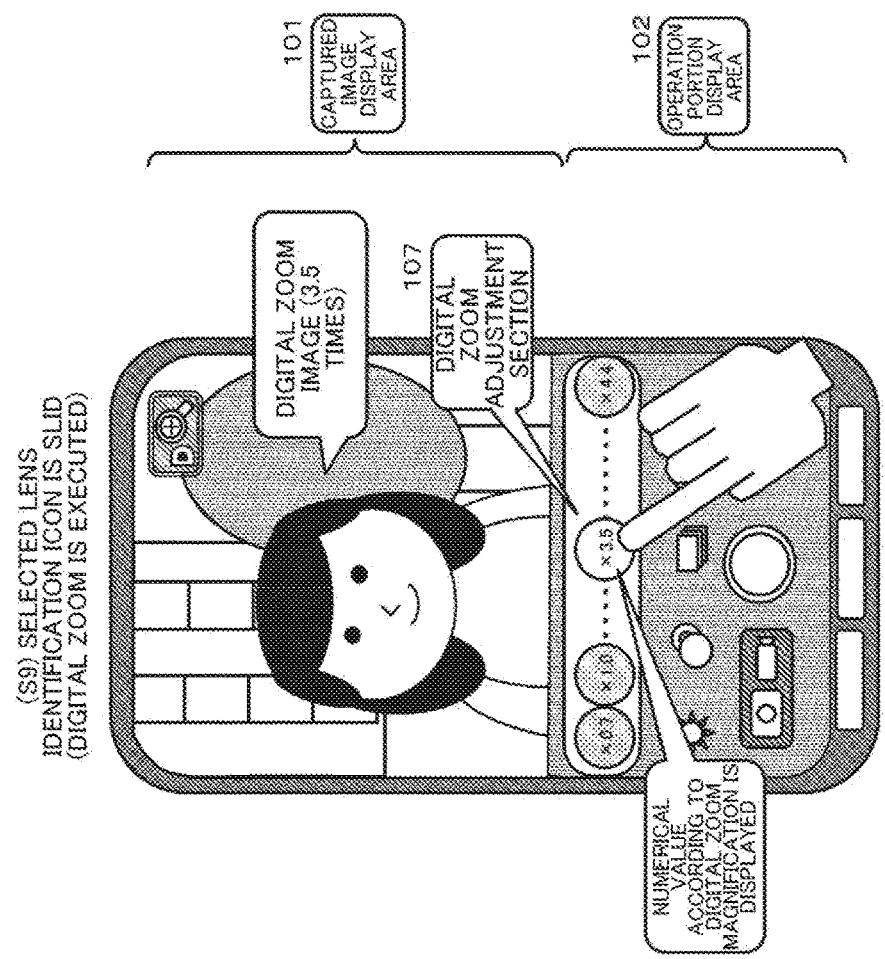
FIG. 11 is a diagram illustrating an example of a series of operations by a user who operates the imaging apparatus and an example of transition of display data according to the user operation.

FIG. 11 illustrates display data when the user slides the touched lens selection icon for the telephoto lens 12c with the lens magnification of 2.9 times to the right within the digital zoom adjustment section 107.

The user slides (moves) the lens selection icon for the telephoto lens 12c with the lens magnification of 2.9 times to a lens selection icon for a super-telephoto lens 12d with a lens magnification of 4.4 times.

According to this slide processing, the numerical value displayed on the lens selection icon for the telephoto lens 12c with the lens magnification of 2.9 times is changed.

In (step S9) of FIG. 11, the lens selection icon for the telephoto lens 12c with the lens magnification of 2.9 times touched by the user is slid to the right, and (×3.5) is displayed on the icon at this position.

This indicates that digital zoom processing for enlarging the image captured using the telephoto lens 12c with the lens magnification of 2.9 times to an image corresponding to an image captured using a lens with a lens magnification of 3.5 times is performed.

A digital zoom image of the image captured by the telephoto lens 12c with the lens magnification of 2.9 times touched by the user is displayed in the captured image display area 101. That is, an image corresponding to an image captured using the lens with the lens magnification of 3.5 times is displayed.

The data processing unit of the imaging apparatus executes image correction processing for the image captured by the telephoto lens 12c with the lens magnification of 2.9 times depending on the slide amount of the lens selection icon slid by the user. The data processing unit of the imaging apparatus executes processing for correcting the captured image, that is, processing for extracting a partial area from the captured image and processing for enlarging an extracted image as digital zoom processing, and displays an image after the processing in the captured image display area 101.

The image displayed in the captured image display area in FIG. 11 (step S9) is the image subjected to this digital zoom processing.

That is, the image is an image generated by executing digital zoom processing for extracting a partial area from the image captured by the telephoto lens 12c with the lens magnification of 2.9 times and enlarging the extracted image. This image corresponds to the image captured using the lens with the lens magnification of 3.5 times.

When the user confirms the image displayed in the captured image display area 101, that is, the same digital zoom image as the image captured using the lens with the lens magnification of 3.5 times, and determines that the user desires to record this image, the user touches the shutter 103. (Step S10)

FIG. 12 (step S10) illustrates a state in which the user touches the shutter 103. That is, FIG. 12 is a diagram illustrating a user operation when the user determines that the user desires to record the image displayed in the captured image display area 101.

The image displayed in the captured image display area 101 of the display unit 11 of the imaging apparatus 10 in (step S10) illustrated in FIG. 12 is the image displayed in (step S9) described with reference to FIG. 11.

That is, the image is a digital zoom processing image for an image captured by a telephoto lens with a lens magnification of 2.9 times. This image is the same as the image captured using the lens with the lens magnification of 3.5 times.

The user confirms this displayed image and touches the shutter 103 when the user determines that the user desires to record this image.

Through this touch processing, processing for capturing the image displayed in the captured image display area 101 is executed, and the image is recorded in the memory.

The image recorded in the memory is the digital zoom processing image for an image captured by a telephoto lens with a lens magnification of 2.9 times.

Thus, the imaging apparatus 10 of the present disclosure displays the lens selection portion (lens selection icon) 105 for selecting a lens to be used for photographing, in the operation portion display area 102 of the display unit 11. Further, when the user touches one lens selection portion (lens selection icon) 105, the digital zoom adjustment section 107 in which the selected one lens selection portion (lens selection icon) is slidable is displayed.

Thereafter, when the lens selection portion (lens selection icon) selected by the user is slid within the digital zoom adjustment section 107, a value of the lens magnification corresponding to a virtual use lens realized by the digital zoom processing is displayed in the lens selection icon.

Further, an image (through image) captured using the selected lens corresponding to the lens selection portion (lens selection icon) 105 selected by the user is displayed in the captured image display area 101 of the display unit 11. Further, when the lens selection portion (lens selection icon) selected by the user is slid within the digital zoom adjustment section 107, an image subjected to digital zoom processing depending on the slide amount, that is, enlargement processing is displayed.

These processes allow the user to capture an ideal subject image of the user and record the subject image in the memory only through selection processing of the lens selection portion (lens selection icon) 105 and the slide processing.

That is, the user does not need to perform processing for switching between UIs of the operation portion when performing two processing including the lens selection processing and the digital zoom processing, can continuously execute the two processing through an operation with respect to the same icon, thereby eliminating a need for processing time of UI switching or the like, and perform photographing processing without missing a shutter chance.

An operation example of the lens selection portion (lens selection icon) 105 by the user and transition of display data of the operation portion according to a user operation will be collectively described with reference to FIGS. 13 to 16.

Figure 13:
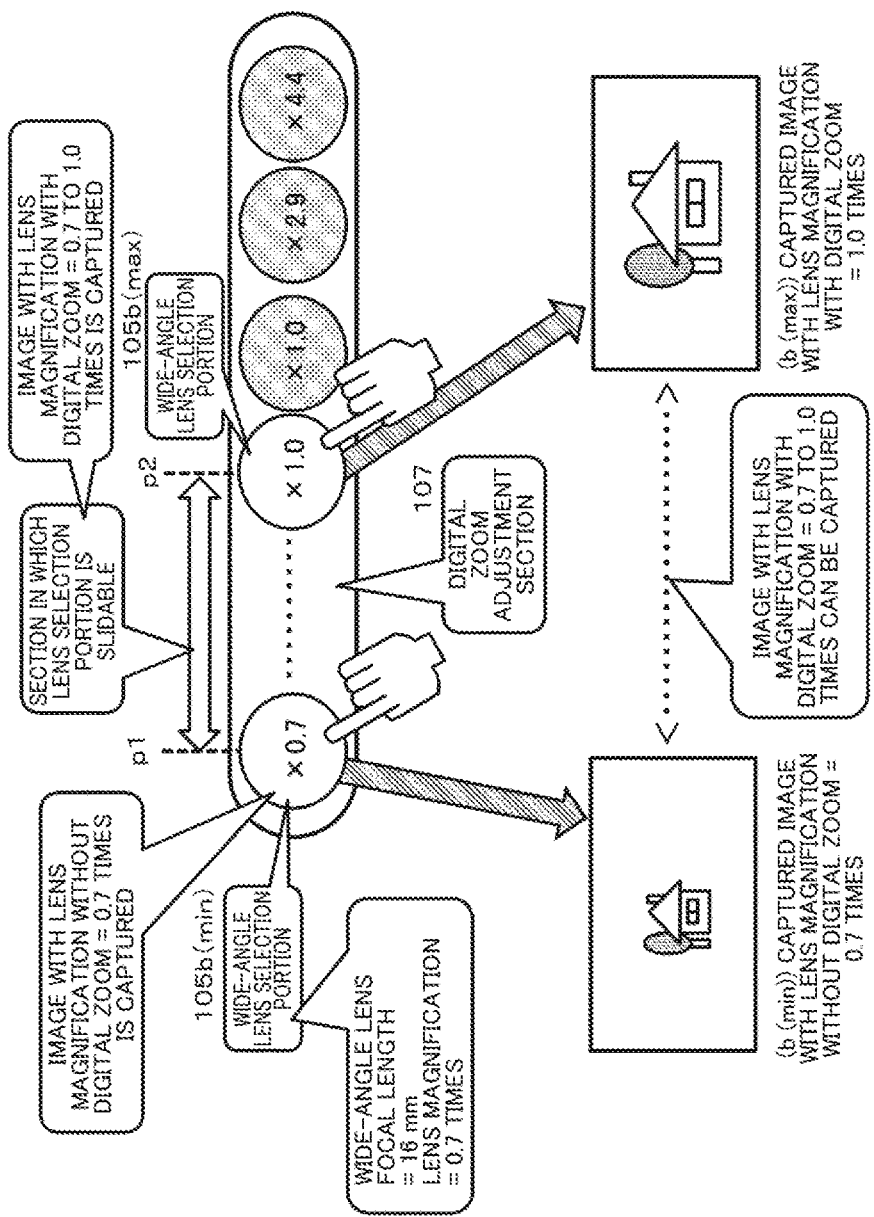
FIG. 13 is a diagram illustrating an example of a series of operations by the user who operates the lens selection portion (lens selection icon) of the imaging apparatus and an example of transition of display data according to the user operation.

FIG. 13 illustrates a section in which the wide-angle lens selection portion 105b is slidable.

When the user touches the wide-angle lens selection portion 105b, the digital zoom adjustment section 107 corresponding to the section in which the wide-angle lens selection portion 105b is slidable is displayed.

The digital zoom adjustment section 107 corresponding to the section in which the wide-angle lens selection portion 105b is slidable is a section from a wide-angle lens selection portion 105b (min) at a left end p1 illustrated in FIG. 13 to a wide-angle lens selection portion 105b (max) at a right end p2 illustrated in FIG. 13, and the wide-angle lens selection portion 105b becomes slidable in this section (p1 to p2).

When the wide-angle lens selection portion 105b is slid within this section (p1 to p2) in which the wide-angle lens selection portion 105b is slidable, displayed numerical values of the wide-angle lens selection portion 105b are sequentially updated and displayed.

The displayed numerical value of the wide-angle lens selection portion 105b is a numerical value indicating a virtual lens magnification when a captured image or a digital zoom image is captured. The numerical values are sequentially updated and displayed between 0.7 and 1.0.

A position p1 of "0.7" among the numerical values (0.7 to 1.0) displayed at the respective slide positions is a position of the wide-angle lens selection portion 105b (min) at the left end, and is a position at which a slide amount of the wide-angle lens selection portion 105b is zero.

The captured image itself of the wide-angle lens 12b with a lens magnification of 0.7 times is displayed in the captured image display area 101 at the position of the wide-angle lens selection portion 105b (min) at the left end.

That is, as shown in (b(min)) in a lower part of FIG. 13, the captured image is an image itself captured by the wide-angle lens 12b, and the captured image not subjected to the digital zoom processing is displayed.

Meanwhile, the numerical value displayed in the wide-angle lens selection portion 105b becomes a numerical value greater than 0.7 and equal to or smaller than 1.0 at a position other than the wide-angle lens selection portion 105b (min) at the left end to which the wide-angle lens selection portion 105b is slid. A maximum lens magnification of 1.0 times is displayed at a position of the wide-angle lens selection portion 105b (max) at the right end p2 illustrated in FIG. 13.

The digital zoom processing image is displayed in the captured image display area 101 in a section in which the wide-angle lens selection portion 105b is slid. That is, a digital zoom image obtained by correcting the image captured by the wide-angle lens 12b with the lens magnification of 0.7 times is displayed. This digital zoom image is a corrected image obtained by cutting out and enlarging a part of the image captured by the wide-angle lens 12b with a lens magnification of 0.7 times.

When the wide-angle lens selection portion 105b is slid to the position p2 of the wide-angle lens selection portion 105b (max) at the right end, the digital zoom processing image as shown in (b(max)) in a lower part of FIG. 13 is displayed in the captured image display area 101.

That is, the corrected image generated by the digital zoom processing for the image captured by the wide-angle lens 12b with the lens magnification of 0.7 times is displayed. Specifically, a corrected digital zoom image that is the same as an image captured using a virtual lens with a lens magnification of 1.0 times is displayed.

Figure 14:
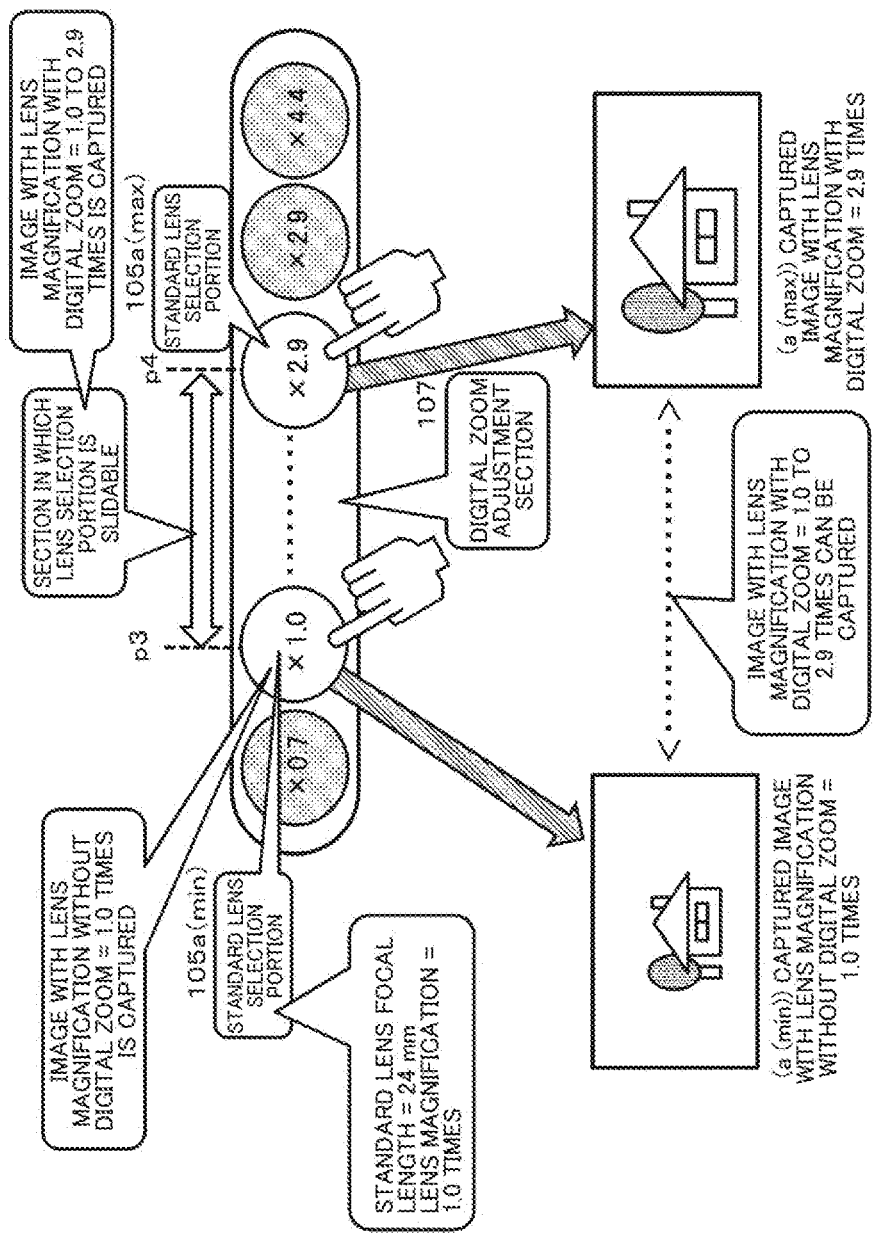
FIG. 14 is a diagram illustrating an example of a series of operations by the user who operates the lens selection portion (lens selection icon) of the imaging apparatus and an example of transition of display data according to the user operation.

FIG. 14 illustrates a section in which a standard lens selection portion 105a is slidable.

When the user touches the standard lens selection portion 105a, a digital zoom adjustment section 107 corresponding to the section in which the standard lens selection portion 105a is slidable is displayed.

The digital zoom adjustment section 107 corresponding to the section in which the standard lens selection portion 105a is slidable is a section from a standard lens selection portion 105a (min) at a left end p3 illustrated in FIG. 14 to a standard lens selection portion 105a (max) at a right end p4 illustrated in FIG. 14, and the standard lens selection portion 105a becomes slidable in this section (p3 to p4).

When the standard lens selection portion 105a is slid within this section (p3 to p4) in which the standard lens selection portion 105a is slidable, displayed numerical values of the standard lens selection portion 105a are sequentially updated and displayed.

The numerical value displayed in the standard lens selection portion 105a is a numerical value indicating a virtual lens magnification when a captured image or a digital zoom image is captured. The numerical values are sequentially updated and displayed between 1.0 and 2.9.

A position p3 of "1.0" among the numerical values (1.0 to 2.9) displayed at the respective slide positions is a position of the standard lens selection portion 105a (min) at the left end, and is a position at which a slide amount of the standard lens selection portion 105a is zero.

The captured image itself of the standard lens 12a with lens magnification of 1.0 times is displayed in the captured image display area 101 at the position of the standard lens selection portion 105a (min) at the left end.

That is, as shown in (a(min)) in a lower part of FIG. 14, the captured image is an image itself captured by the standard lens 12a, and the captured image not subjected to the digital zoom processing is displayed.

On the other hand, the numerical value displayed in the standard lens selection portion 105a is a numerical value greater than 1.0 and equal to or smaller than 2.9 at a position other than the standard lens selection portion 105a (min) at the left end to which the standard lens selection portion 105a is slid. A maximum lens magnification of 2.9 times is displayed at a position of the standard lens selection portion 105a (max) at the right end p4 illustrated in FIG. 14.

The digital zoom processing image is displayed in the captured image display area 101 in a section in which the standard lens selection portion 105a is slid.

That is, a digital zoom image obtained by correcting the image captured by the standard lens 12a with the lens magnification of 1.0 times is displayed. This digital zoom image is a corrected image obtained by cutting out and enlarging a part of the image captured by the standard lens 12a with the lens magnification of 1.0 times.

When the standard lens selection portion 105a is slid to the position p4 of the standard lens selection portion 105a (max) at the right end, the digital zoom processing image as shown in (a(max)) in the lower part of FIG. 14 is displayed in the captured image display area 101.

That is, the corrected image generated by the digital zoom processing for the image captured by the standard lens 12a with the lens magnification of 1.0 times is displayed. Specifically, a corrected digital zoom image that is the same as an image captured using a virtual lens with a lens magnification of 2.9 times is displayed.

Figure 15:
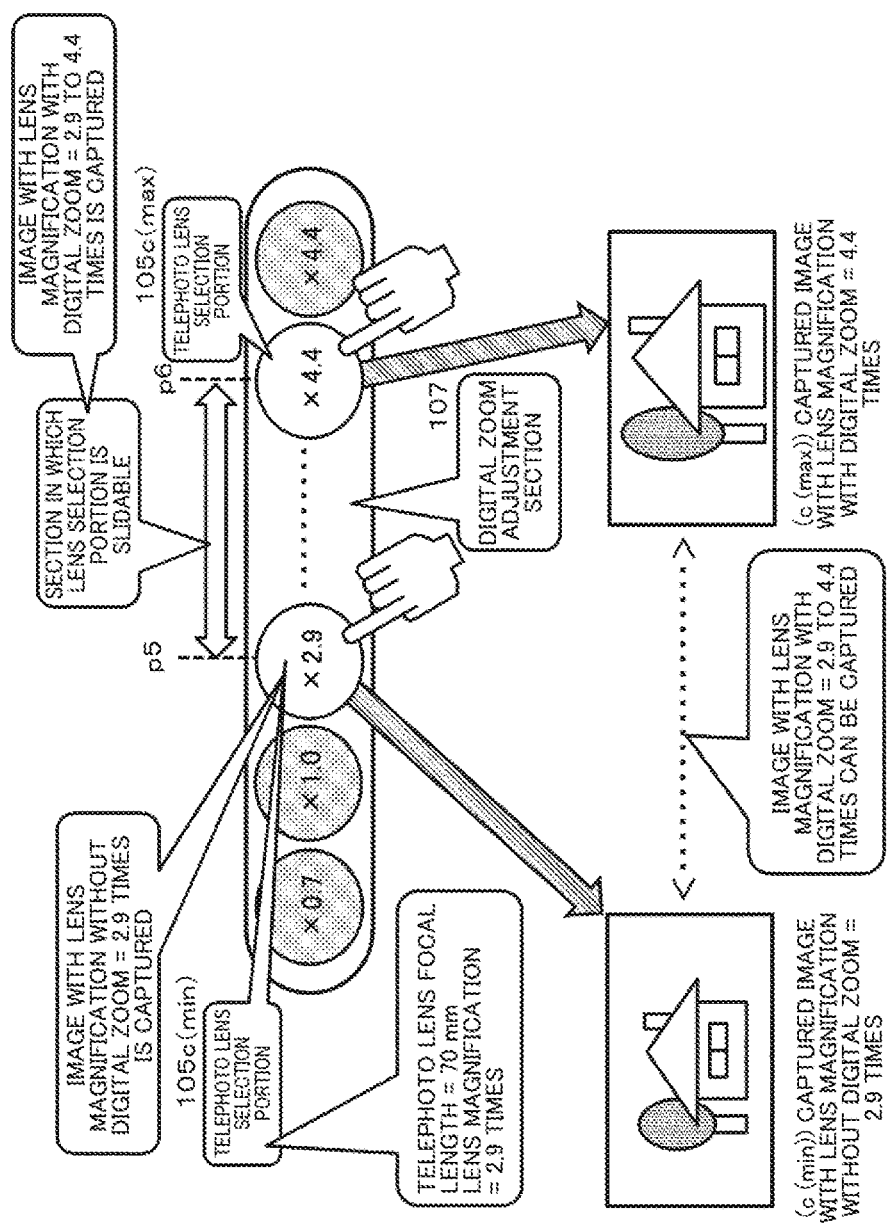
FIG. 15 is a diagram illustrating an example of a series of operations by the user who operates the lens selection portion (lens selection icon) of the imaging apparatus and an example of transition of display data according to the user operation.

FIG. 15 illustrates a section in which the telephoto lens selection portion 105c is slidable.

When the user touches the telephoto lens selection portion 105c, the digital zoom adjustment section 107 corresponding to the section in which the telephoto lens selection portion 105c is slidable is displayed.

The digital zoom adjustment section 107 corresponding to the section in which the telephoto lens selection portion 105c is slidable is a section from a telephoto lens selection portion 105c (min) at the left end p5 illustrated in FIG. 15 to a telephoto lens selection portion 105c (max) at a right end p6 illustrated in FIG. 15, and the telephoto lens selection portion 105c becomes slidable in this section (p5 to p6).

When the telephoto lens selection portion 105c is slid within this section (p5 to p6) in which telephoto lens selection portion 105c is slidable, displayed numerical values of the telephoto lens selection portion 105c are sequentially updated and displayed.

The displayed numerical value of the telephoto lens selection portion 105c is a numerical value indicating a virtual lens magnification when a captured image or a digital zoom image is captured. The numerical values are sequentially updated and displayed between 2.9 and 4.4.

A position p5 of "2.9" among numerical values (2.9 to 4.4) displayed at the respective slide positions is a position of the telephoto lens selection portion 105c (min) at the left end, and is a position at which a slide amount of the telephoto lens selection portion 105c is 0.

The captured image itself of the telephoto lens 12c with the lens magnification of 2.9 times is displayed in the captured image display area 101 at the position of the telephoto lens selection portion 105c (min) at the left end.

That is, as shown in (c(min)) in a lower part of FIG. 15, the image is the image itself captured by the telephoto lens 12c, and the captured image not subjected to the digital zoom processing is displayed.

Meanwhile, the numerical value displayed in the telephoto lens selection portion 105c is a numerical value greater than 2.9 and equal to or smaller than 4.4 at a position other than the telephoto lens selection portion 105c (min) at the left end to which the telephoto lens selection portion 105c is slid. A maximum lens magnification of 4.4 is displayed at a position of the telephoto lens selection portion 105c (max) at the right end p6 illustrated in FIG. 15.

The digital zoom processing image is displayed in the captured image display area 101 in a section in which the telephoto lens selection portion 105c is slid.

That is, a digital zoom image obtained by correcting the image captured by the telephoto lens 12c with the lens magnification of 2.9 times is displayed. This digital zoom image is a corrected image obtained by cutting out and enlarging a part of the image captured by the telephoto lens 12c with the lens magnification of 2.9 times.

When the telephoto lens selection portion 105c is slid to the position p6 of the telephoto lens selection portion 105c (max) at the right end, the digital zoom processing image as shown in (c(max)) in the lower part of FIG. 15 is displayed in the captured image display area 101.

That is, the corrected image generated by the digital zoom processing for the image captured by the telephoto lens 12c with the lens magnification of 2.9 times is displayed. Specifically, a corrected digital zoom image that is the same as an image captured using a virtual lens with a lens magnification of 4.4 times is displayed.

Figure 16:
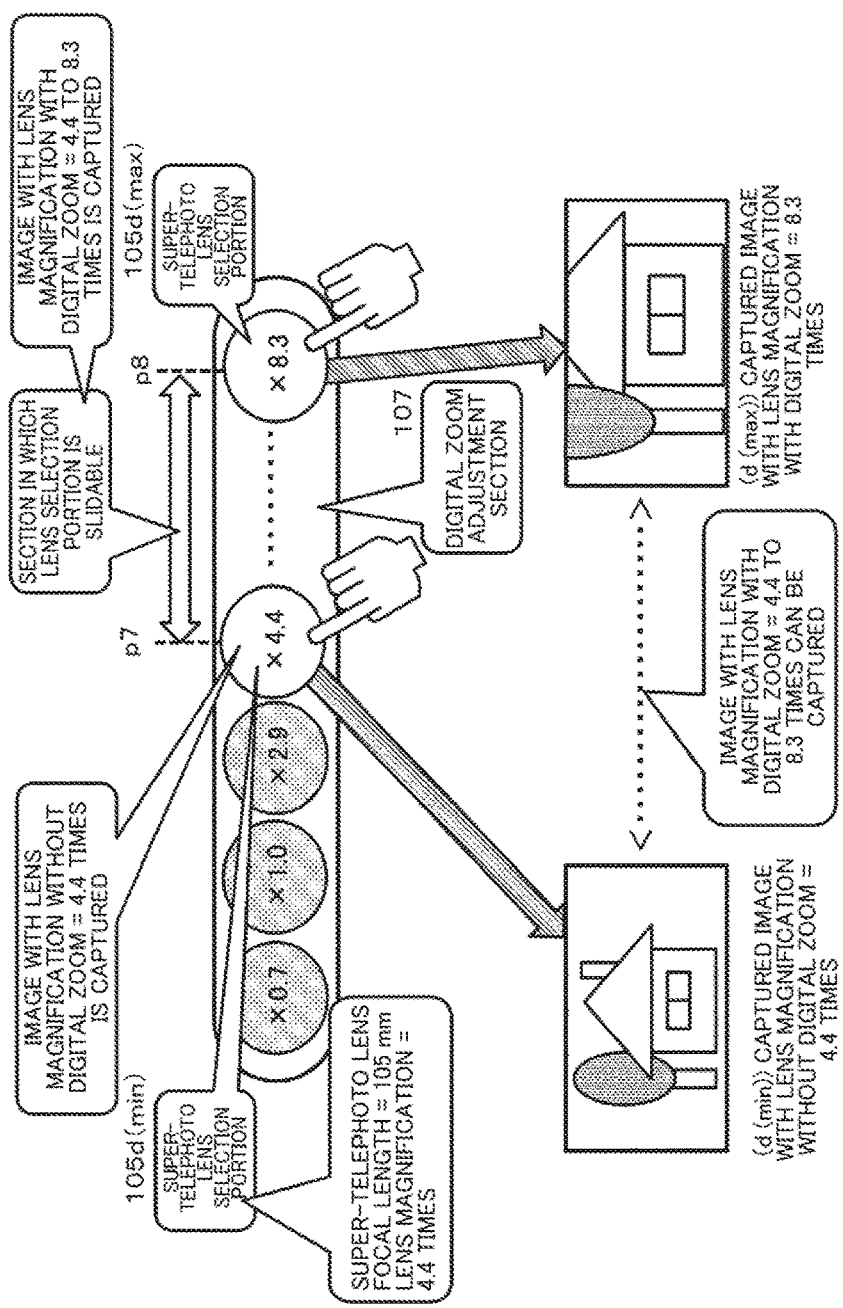
FIG. 16 is a diagram illustrating an example of a series of operations by the user who operates the lens selection portion (lens selection icon) of the imaging apparatus and an example of transition of display data according to the user operation.

FIG. 16 illustrates a section in which the super-telephoto lens selection portion 105d is slidable.

When the user touches the super-telephoto lens selection portion 105d, the digital zoom adjustment section 107 corresponding to the section in which the super-telephoto lens selection portion 105d is slidable is displayed.

The digital zoom adjustment section 107 corresponding to the section in which the super-telephoto lens selection portion 105d is slidable is a section from a super-telephoto lens selection portion 105d (min) at a left end p7 illustrated in FIG. 16 to a section of the super-telephoto lens selection portion 105d (max) at a right end p8 illustrated in FIG. 16, and the super-telephoto lens selection portion 105d is slidable in this section (p7 to p8).

When the super-telephoto lens selection portion 105d is slid within this section (p7 to p8) in which the super-telephoto lens selection portion 105d is slidable, the displayed numerical values of the super-telephoto lens selection portion 105d are sequentially updated and displayed.

The displayed numerical value of the super-telephoto lens selection portion 105d is a numerical value indicating a virtual lens magnification when a captured image or a digital zoom image is captured. The numerical values are sequentially updated and displayed between 4.4 and 8.3.

A position p7 of "4.4" among the numerical values (4.4 to 8.3) displayed at the respective slide positions is a position of the super-telephoto lens selection portion 105d (min) at the left end, and is a position at which a slide amount of the super-telephoto lens selection portion 105d is zero.

The image itself captured by the super-telephoto lens 12d with a lens magnification of 4.4 is displayed in the captured image display area 101 at the position of the super-telephoto lens selection portion 105d (min) at the left end.

That is, as shown in (d(min)) in a lower part of FIG. 16, the captured image is an image itself captured by the super-telephoto lens 12d, and the captured image not subjected to the digital zoom processing is displayed.

On the other hand, a numerical value displayed in the super-telephoto lens selection portion 105d becomes a numerical value greater than 4.4 and equal to or smaller than 8.3 at a position other than the super-telephoto lens selection portion 105d (min) at the left end to which the super-telephoto lens selection portion 105d is slid. A maximum lens magnification of 8.3 times is displayed at a position of the super-telephoto lens selection portion 105d (max) at the right end p8 illustrated in FIG. 16.

The digital zoom processing image is displayed in the captured image display area 101 in a section in which the super-telephoto lens selection portion 105d is slid. That is, a digital zoom image obtained by correcting the image captured by the super-telephoto lens 12d with a lens magnification of 4.4 is displayed. This digital zoom image is a corrected image obtained by cutting out and enlarging a part of the image captured by the super-telephoto lens 12d with a lens magnification of 4.4.

When the super-telephoto lens selection portion 105d is slid to the position p8 of the super-telephoto lens selection portion 105d (max) at the right end, the digital zoom processing image as shown in (d(max)) in the lower part of FIG. 16 is displayed in the captured image display area 101.

That is, the corrected image generated by the digital zoom processing for the image captured by the super-telephoto lens 12d with a lens magnification of 4.4 times is displayed. Specifically, a corrected digital zoom image that is the same as an image captured using a virtual lens with a lens magnification of 8.3 times is displayed.

3. OPERATION PORTION UI DISPLAY CONTROL PROCESSING SEQUENCE EXECUTED BY IMAGING APPARATUS OF PRESENT DISCLOSURE

Next, an operation portion UI display control processing sequence executed by the imaging apparatus of the present disclosure will be described.

The operation portion UI display control processing sequence executed by the imaging apparatus of the present disclosure will be described with reference to a flowchart illustrated in FIG. 17.

Figure 17:
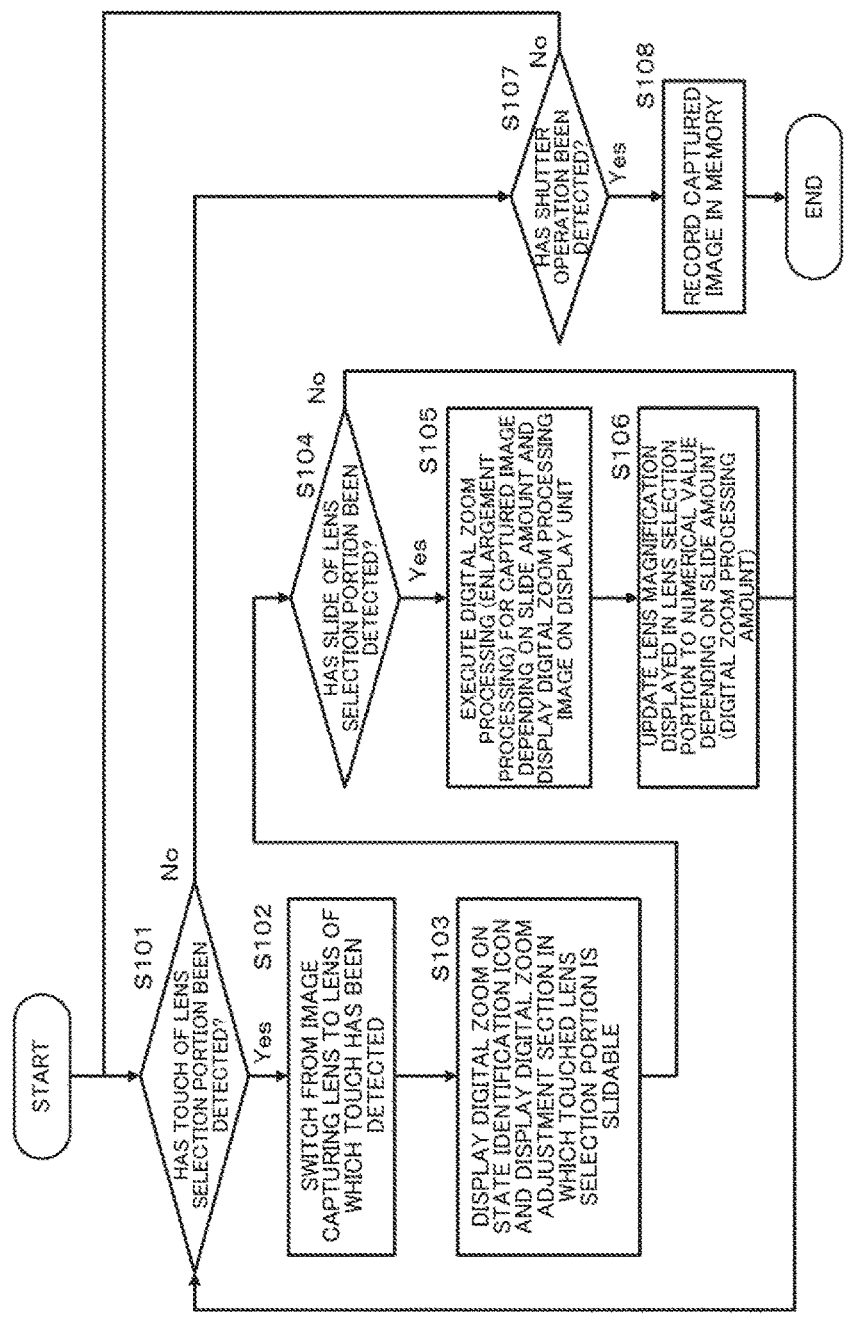
FIG. 17 is a diagram illustrating a flowchart illustrating a processing sequence that is executed by the imaging apparatus of the present disclosure.

Processing according to a flow illustrated in FIG. 17 can be executed in the data processing unit of the imaging apparatus 10 according to a program stored in the storage unit of the imaging apparatus 10. The data processing unit includes, for example, a processor such as a CPU having a program execution function, and can perform processing according to a flow through program execution processing using the processor.

Hereinafter, processing of each step shown in the flowchart of FIG. 17 will be described.

(Step S101)

First, in step S101, the data processing unit of the imaging apparatus 10 determines whether or not touch processing with respect to the lens selection portion (lens selection icon) 105 displayed in the operation portion display area 102 of the display unit 11 of the imaging apparatus 10 by the user has been detected.

When a determination is made that user touch processing with respect to the lens selection portion (lens selection icon) 105 has been detected, the processing proceeds to step S102.

On the other hand, when the user touch processing with respect to the lens selection portion (lens selection icon) 105 has not been detected in step S101, for example, when it has been detected that the user has taken away the finger from the lens selection portion 105, the processing proceeds to step S107 to determine whether or not the operation (touch) with respect to the shutter 103 by the user has been detected.

When the shutter operation (touch) by the user has not been detected, the processing returns to step S101.

On the other hand, when the shutter operation (touch) by the user has been detected, the processing proceeds to step S108 to execute image capturing and record a captured image in the memory.

(Step S102)

When a determination is made in step S101 that the touch processing with respect to the lens selection portion (lens selection icon) 105 by the user has been detected, the data processing unit of the imaging apparatus 10 executes processing for switching an image capturing lens to the lens touched by the user, that is, the lens selected by the user in step S102.

For example, when the lens selection portion (lens selection icon) touched by the user is an icon for a telephoto lens (lens magnification of 2.9 times), processing for switching the photographing lens to the telephoto lens is performed.

This state corresponds to, for example, the state (step S7) in FIG. 10 described above.

(Step S103)

Next, in step S103, the data processing unit of the imaging apparatus 10 displays the digital zoom ON state identification icon 106 on the display unit 11 of the imaging apparatus 10, and displays the digital zoom adjustment section 107 in which the touched lens selection portion is slidable.

This state corresponds to, for example, the state (step S8) in FIG. 10 described above.

(Step S104)

Next, in step S104, the data processing unit of the imaging apparatus 10 detects whether or not the touched lens selection portion has been slid by the user.

When it has been detected that the lens selection portion has been slid by the user, the processing proceeds to step S105.

On the other hand, when the lens selection portion has not been slid by the user, the processing returns to step S101 to execute the following processing.

Processing (a) to (c2) to be described below are processing that are executed when a determination is made in step S104 that the lens selection portion has not been slid by the user.

(a) The processing returns to step S101 to determine whether or not a new touch with respect to the lens selection portion by the user has been detected.

(b1) When a determination is made in step S101 that the new touch with respect to the lens selection portion by the user has been detected, the processing proceeds to step S102.

(b2) On the other hand, when new user touch processing with respect to the lens selection portion (lens selection icon) 105 has not been detected in step S101, for example, when it has been detected that the user has taken away the finger from the lens selection portion 105, the processing proceeds to step S107 to determine whether or not the operation (touch) with respect to the shutter 103 by the user has been detected.

(c1) When the shutter operation (touch) by the user has not been detected, the processing returns to step S101.

(c2) On the other hand, when the shutter operation (touch) by the user has been detected, the processing proceeds to step S108 to execute image capturing and record a captured image in the memory.

Thus, when a determination is made in step S104 that the touched lens selection portion is not slid by the user, the processing (a) to (c2) are executed.

On the other hand, when it has been detected in step S104 that the lens selection portion has been slid by the user, the processing proceeds to step S105. Hereinafter, processing of step S105 and subsequent steps will be described.

(Steps S105 and S106)

In step S104, when the slide processing for the lens selection portion (lens selection icon) 105 by the user has been detected, the data processing unit of the imaging apparatus 10 executes the following processing in steps S105 and S106.

In step S105, the data processing unit of the imaging apparatus 10 executes digital zoom processing (enlargement processing) for the captured image depending on the slide amount of the lens selection portion (lens selection icon) of the user, and displays the digital zoom processing image in the captured image display area 101 of the display unit 11.

Further, in step S106, the data processing unit of the imaging apparatus 10 executes processing for updating the lens magnification displayed in the lens selection portion (lens selection icon) slid by the user to a numerical value depending on the slide amount (digital zoom processing amount).

A state in which steps S105 and S106 are executed corresponds to, for example, the state of (step S9) in FIG. 11 described above.

The processing of step S105 and the processing of step S106 may be executed in parallel.

After the processing of steps S105 and S106, the processing returns to step S101 to determine whether or not the new touch with respect to the lens selection portion by the user has been detected.

When a determination is made that the new touch with respect to the lens selection portion by the user has been detected, the processing proceeds to step S102.

On the other hand, when the new user touch processing with respect to the lens selection portion (lens selection icon) 105 has not been detected, the processing proceeds to step S107. For example, when it has been detected that a finger of the user has taken away the lens selection portion (lens selection icon) 105, the processing proceeds to step S107.

(Step S107)

The processing in step S107 is processing that is executed when the user touch processing with respect to the lens selection portion (lens selection icon) 105 has not been detected in step S101, for example, when it has been detected that the finger of the user has taken away the lens selection portion 105.

In this case, the data processing unit of the imaging apparatus 10 determines whether or not touch of the shutter 103 by the user has been detected in step S107.

When the shutter operation (touch) by the user has not been detected, the processing returns to step S101.

On the other hand, when the shutter operation (touch) by the user has been detected, the processing proceeds to step S108.

(Step S108)

When the shutter operation (touch) by the user has been detected in step S107, the data processing unit of the imaging apparatus 10 executes image capturing and records the captured image in the memory in step S108.

This image capturing processing corresponds to, for example, the image capturing processing of (step S6) in FIG. 9 or the image capturing processing of (step S10) in FIG. 12 described above.

As described above, the imaging apparatus 10 of the present disclosure displays the lens selection portion (lens selection icon) 105 for selecting a lens to be used for photographing, in the operation portion display area 102 of the display unit 11, and displays the digital zoom adjustment section 107 in which the selected one lens selection portion (lens selection icon) is slidable when the user touches one lens selection portion (lens selection icon) 105.

Further, when the lens selection portion (lens selection icon) selected by the user is slid within the digital zoom adjustment section 107, a value of the lens magnification corresponding to a virtual use lens realized by the digital zoom processing is displayed in the lens selection icon.

Further, the image (through image) captured using the selected lens corresponding to the lens selection portion (lens selection icon) 105 selected by the user is displayed in the captured image display area 101 of the display unit 11. Further, when the lens selection portion (lens selection icon) selected by the user is slid within the digital zoom adjustment section 107, an image subjected to digital zoom processing depending on the slide amount is displayed.

These processes allow the user to capture an ideal subject image of the user and record the subject image in the memory only through selection processing of the lens selection portion (lens selection icon) 105 and the slide processing.

4. DISPLAY CONTROL PROCESSING FOR NOTIFYING USER OF IMAGE QUALITY DEGRADATION DUE TO DIGITAL ZOOM

Next, display control processing for notifying the user of the deterioration of the image quality due to digital zoom executed by the imaging apparatus 10 of the present disclosure will be described.

As described above, the digital zoom processing is performed as the image enlargement processing for a captured image. For example, a portion of the image captured using the standard lens is cropped and enlarged so that it is possible to generate an intermediate image between the image captured using the standard lens and the image captured using the telephoto lens.

A specific example of image enlargement processing in the digital zoom processing will be described with reference to FIG. 18.

Figure 18:
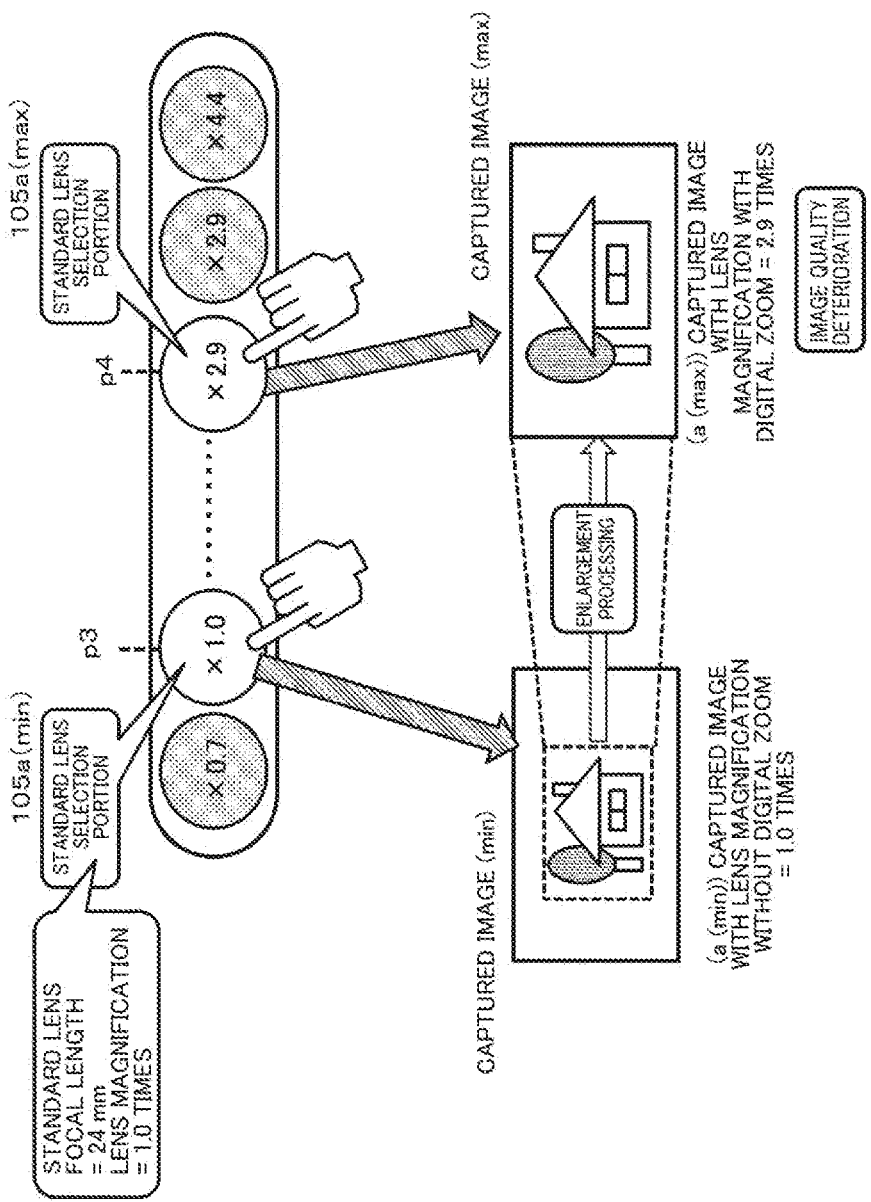
FIG. 18 is a diagram illustrating a specific example of image enlargement processing in digital zoom processing.

In FIG. 18, a captured image (min) captured with the standard lens selection portion 105a set to a position (lens magnification=1.0) at a left end p3 in a slide section, and a captured image (max) at a position (lens magnification of 2.9 times) at a right end p4 in the slide section of the standard lens selection portion 105a are shown.

The captured image (min) captured with the standard lens selection portion 105a set to the position (lens magnification=1.0) at the left end p3 of the slide section is "captured image (min)" in a lower part. This is the image itself captured by the standard lens 12a, and is a captured image not subjected to the digital zoom processing.

On the other hand, the captured image (max) captured with the standard lens selection portion 105a set to the position (lens magnification of 2.9 times) at the right end p4 of the slide section is a "captured image (max)" in the lower part. This is a digital zoom processing image of the image captured by the standard lens 12a. That is, a dotted-line rectangular area of the "captured image (min)" shown on the left side in the lower part of FIG. 18 is cut out and enlarged so that the "captured image (max)" shown on the right side in the lower part of FIG. 18 is generated.

Thus, the digital zoom processing image can be generated by enlarging a partial area of the original image, that is, the captured image not subjected to the digital zoom processing, at an enlargement ratio according to the digital zoom amount.

When the number of pixels of a captured image not subjected to enlargement processing at all, for example, the "captured image (min)" is "n×m", the number of pixels of a dotted line image area extracted in the digital zoom processing is the number of pixels smaller than "n×m", for example "s×t".

That is, since the digital zoom image generated with the enlargement processing is an image of "n×m" pixels obtained by interpolating data of an s×t pixel area cut out from an "n×m" pixel area input from an image sensor by the digital zoom processing with data from neighboring pixels, the image quality or resolution is impaired as compared with an image stored without being subjected to digital zoom from original "n×m" pixels.

Figure 19:
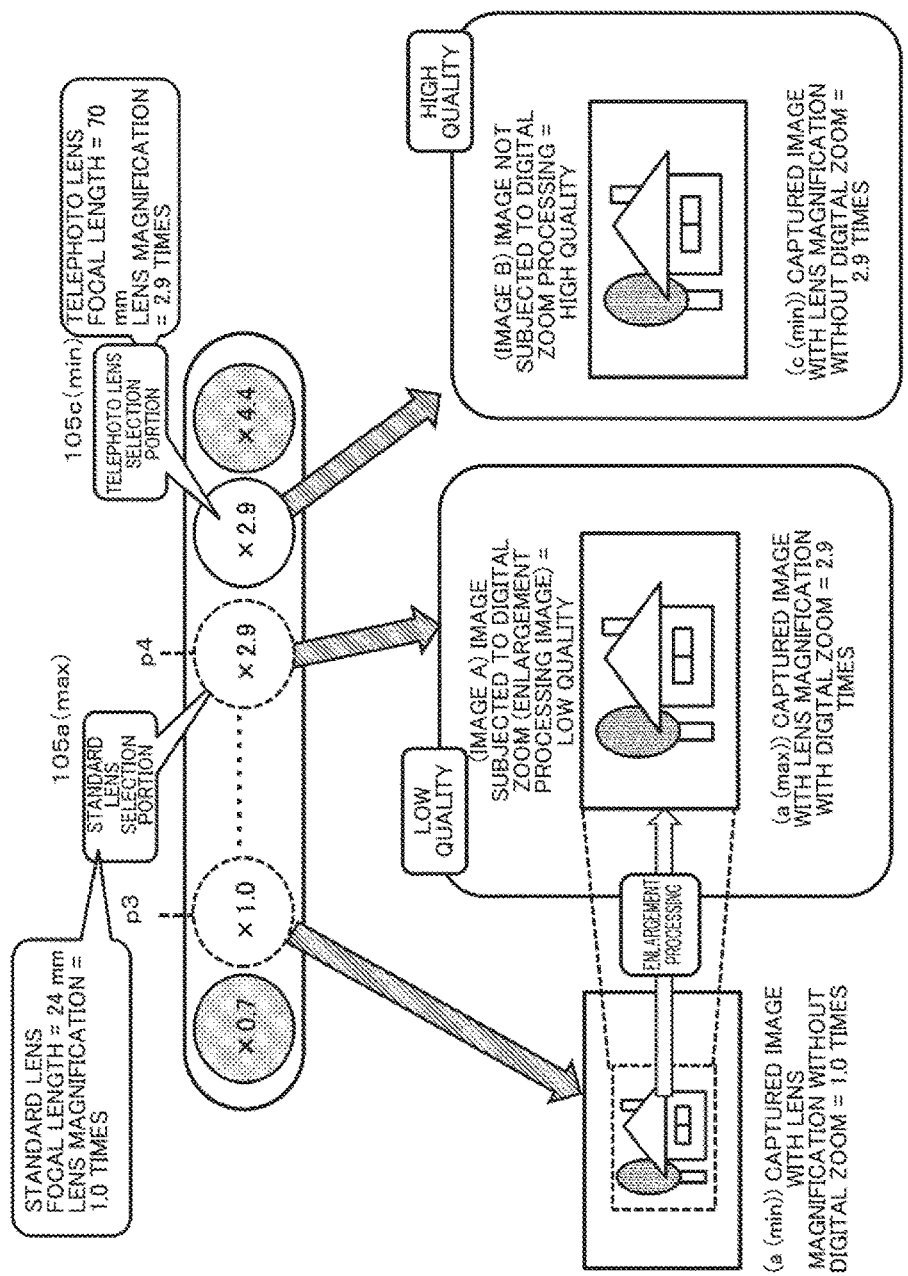
FIG. 19 is a diagram illustrating a specific example of image quality degradation in the digital zoom processing.

A bottom right of FIG. 19 shows the following two images.
(Image A) An image captured with the standard lens selection portion 105a set to the position (lens magnification of 2.9 times) at the right end p4 of the slide section
(Image B) An image captured with the telephoto lens selection portion 105c not slid (Image A) is a digital zoom processing image. That is, (image A) is a digital zoom processing image generated by cutting out and enlarging a dotted-line rectangular area of the "captured image (min)" captured with (lens magnification=1.0) without the standard lens selection portion 105a shown at the lower left of FIG. 19 being slid.

On the other hand, (Image B) is the image captured with the telephoto lens selection portion 105c not slid, and is an image not subjected to the digital zoom processing.

Both (Image A) and (Image B) correspond to images captured using the lens with the lens magnification of 2.9 times, and are images having the same setting of an angle of view of the image or the same size of a subject.

However, (image A) is a digital zoom image obtained by cutting out and enlarging a partial area (s×t pixels) of the original captured image (n×m pixels), and is an image generated on the basis of pixel data of s×t pixels smaller than n×m pixels. On the other hand, (image B) is not subjected to the digital zoom processing (enlargement processing), and has a data amount corresponding to the number of constituent pixels (n×m pixels) of the original captured image.

That is, (image A) subjected to the digital zoom processing (enlargement processing) is an image generated on the basis of less pixel data than (image B) not subjected to the digital zoom processing (enlargement processing).

As a result, (image A) subjected to the digital zoom processing (enlargement processing) is an image whose image quality is lower than (image B) not subjected to the digital zoom processing.

However, the user may capture the digital zoom image without noticing such deterioration of the image quality in many cases.

Especially, it is difficult to clearly recognize the deterioration of the image quality on a small screen of a smartphone or the like, the digital zoom tends to be used frequently.

An embodiment to be described below is an embodiment in which display control for notifying the user of the deterioration of the image quality due to the digital zoom processing is performed.

The imaging apparatus 10 of the present disclosure executes display processing for notifying the user of the deterioration of the image quality due to the digital zoom processing in the operation portion display area 102 of the display unit 11. Hereinafter, an example of a plurality of pieces of display data for notification of the deterioration of the image quality will be described.

Figure 20:
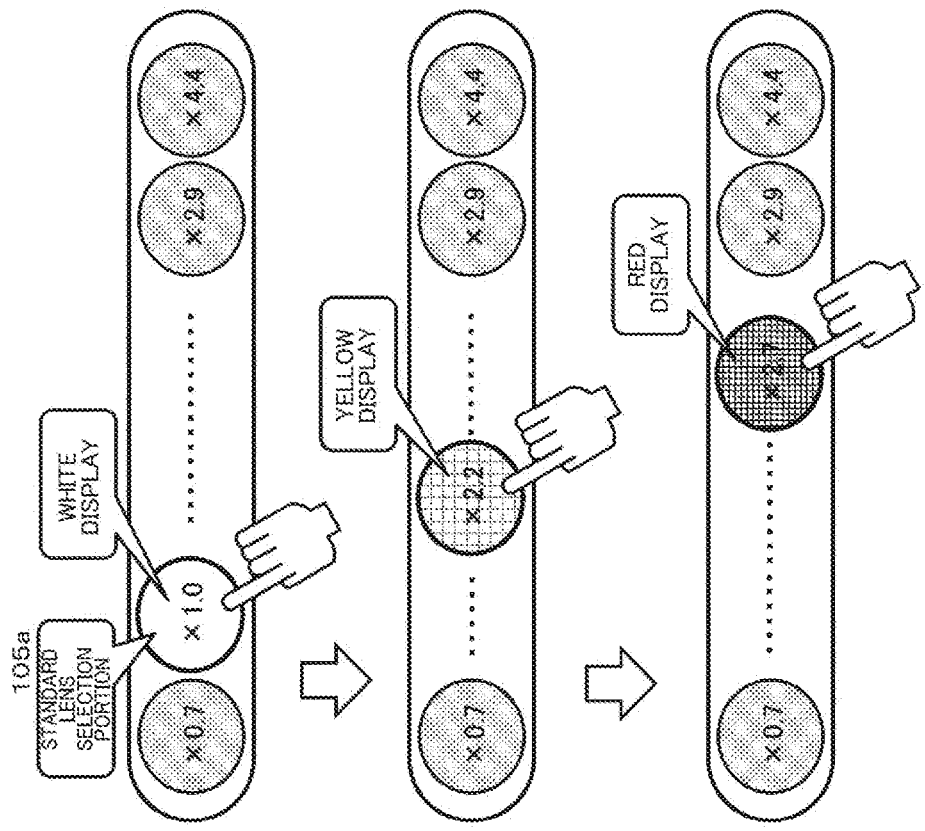
FIGS. 20A, 20B, and 20C are diagrams illustrating a specific example of display data for notifying the user of deterioration of image quality due to the digital zoom processing.

FIGS. 20A, 20B, and 20C are diagrams illustrating an example of display data for the notification of deterioration of image quality due to the digital zoom processing.

In FIGS. 20A, 20B, and 20C, states in which the user slides the standard lens selection portion 105a from a position at a left end (lens magnification=1.0) to the right are shown as FIGS. 20A, 20B, and 20C.

FIG. 20A is a state in which the standard lens selection portion 105a has been set to the left end position (lens magnification=1.0) of the slide section. That is, the slide amount is 0, and an image captured at this position is an image not subjected to the digital zoom processing.

The data processing unit of the imaging apparatus 10 of the present disclosure sets an output light of the standard lens selection portion 105a to white when the standard lens selection portion 105a is at this position (a left end of the slide section).

The output light of the standard lens selection portion 105a is set to white so that the user is notified that the digital zoom amount is 0 and image quality is not degraded.

FIG. 20B is a state in which the standard lens selection portion 105a is slid from the left end position (lens magnification=1.0) to the right and moved to approximately a center of the slide section. That is, the slide amount is approximately (½) of the slide section. An image captured at this position is an image subjected to the digital zoom processing, that is, image cut-out and enlargement processing. However, the enlargement ratio is low and the level of the deterioration of the image quality is low.

The data processing unit of the imaging apparatus 10 of the present disclosure sets the output light of the standard lens selection portion 105a to yellow when the standard lens selection portion 105a is at this position (approximately at the center of the slide section).

The output light of the standard lens selection portion 105a is set to yellow so that the user is notified that the digital zoom amount is small, but the image quality is somewhat degraded.

FIG. 20C is a state in which the standard lens selection portion 105a has been further slid to the right and moved approximately to a right end of the slide section. That is, the slide amount is the substantially entire slide section. The image captured at this position is the image subjected to the digital zoom processing, that is, image cut-out and enlargement processing, and has a high enlargement ratio and a high level of the deterioration of the image quality.

The data processing unit of the imaging apparatus 10 of the present disclosure sets the output light of the standard lens selection portion 105a to red when the standard lens selection portion 105a is at this position (approximately at the right end of the slide section).

The output light of the standard lens selection portion 105a is set to red so that the user is notified that the digital zoom amount is large and the image quality is greatly degraded.

Thus, the data processing unit of the imaging apparatus 10 of the present disclosure executes display control for changing the output light of the lens selection portion 105 depending on the slide amount of the lens selection portion 105. Such display control is performed so that it becomes possible to notify the user of the digital zoom amount or the deterioration of the image quality level depending on the slide amount of the lens selection portion 105.

With this processing, the user can take measures such as switching the lens to be used to another lens when the deterioration of the image quality is large.

Figure 21:
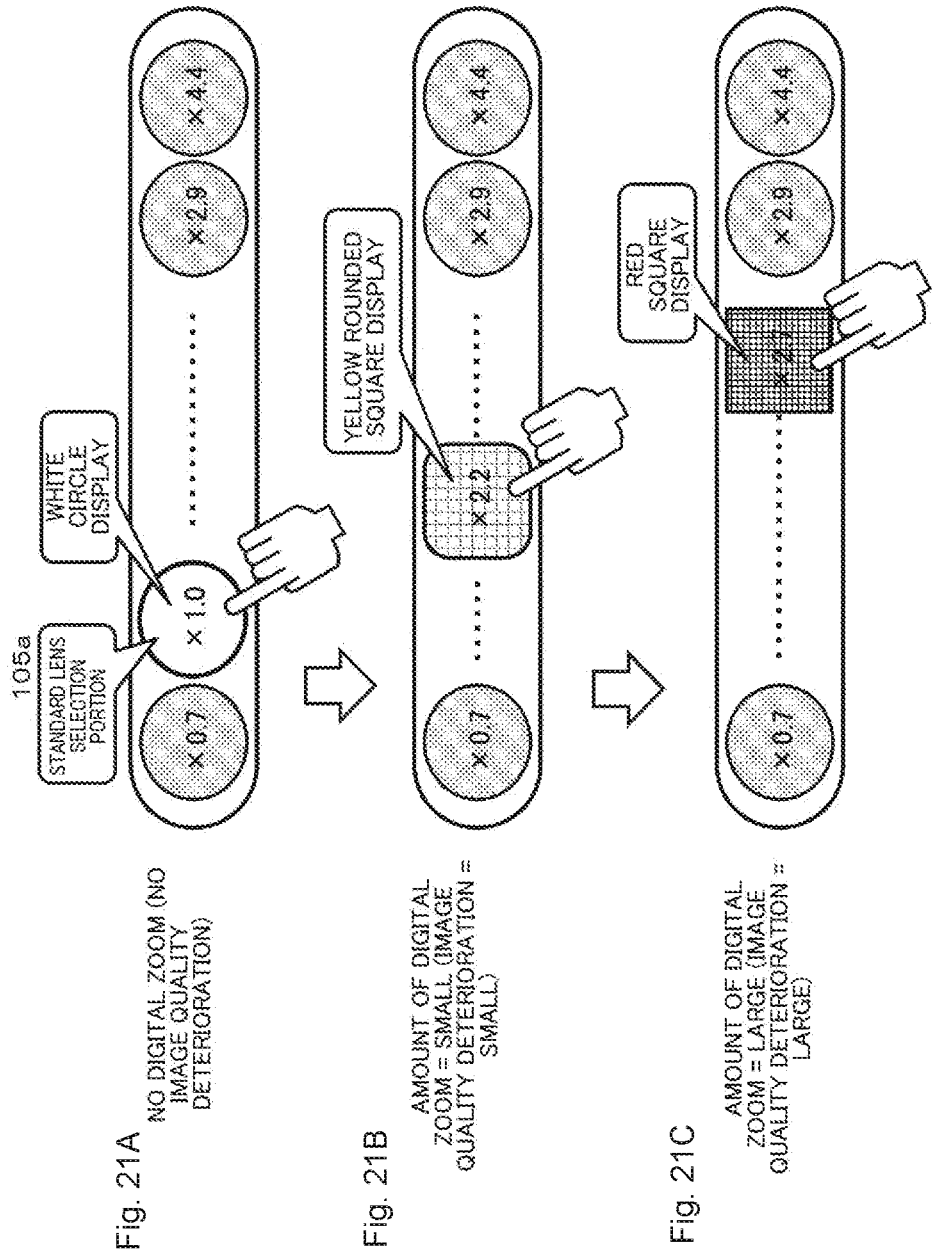

FIGS. 21A, 21B, and 21C are diagrams illustrating an example of different display data for notifying the deterioration of the image quality due to the digital zoom processing.

In FIGS. 21A, 21B, and 21C, states in which the user slides the standard lens selection portion 105a from a position at a left end (lens magnification=1.0) to the right are shown as FIGS. 21A, 21B, and 21C, similar to FIGS. 20A, 20B, and 20C.

FIG. 21A is a state in which the standard lens selection portion 105a has been set to the left end position (lens magnification=1.0) of the slide section.

FIG. 21B is a state in which the standard lens selection portion 105a is slid from the left end position (lens magnification=1.0) to the right and moved to approximately the center of the slide section.

FIG. 21C is a state in which the standard lens selection portion 105a has been further slid to the right and moved approximately to the right end of the slide section. These are the three states.

In FIG. 21A, the data processing unit of the imaging apparatus 10 of the present disclosure sets the output light of the standard lens selection portion 105a to white.

The output light of the standard lens selection portion 105a is set to white so that the user is notified that the digital zoom amount is 0 and that image quality is not degraded.

This display control processing is the same display control processing as in FIG. 20A.

In the state FIG. 21B, the output light of the standard lens selection portion 105a is set to yellow, and the shape is also changed. That is, a shape of the standard lens selection portion 105a is set to a rounded square shape.

In the state FIG. 21C, the output light from the standard lens selection portion 105a is set to red, and the shape thereof is changed to a square shape.

The example illustrated in FIGS. 21A, 21B, and 21C shows a configuration that performs display control processing for changing the shape of the standard lens selection portion 105a, in addition to the change in the color of the output light of the standard lens selection portion 105a.

Such display control is performed so that it becomes possible to notify the user of the digital zoom amount or the deterioration of the image quality level depending on the slide amount of the lens selection portion 105 in an easy-to-understand manner.

Figure 22:
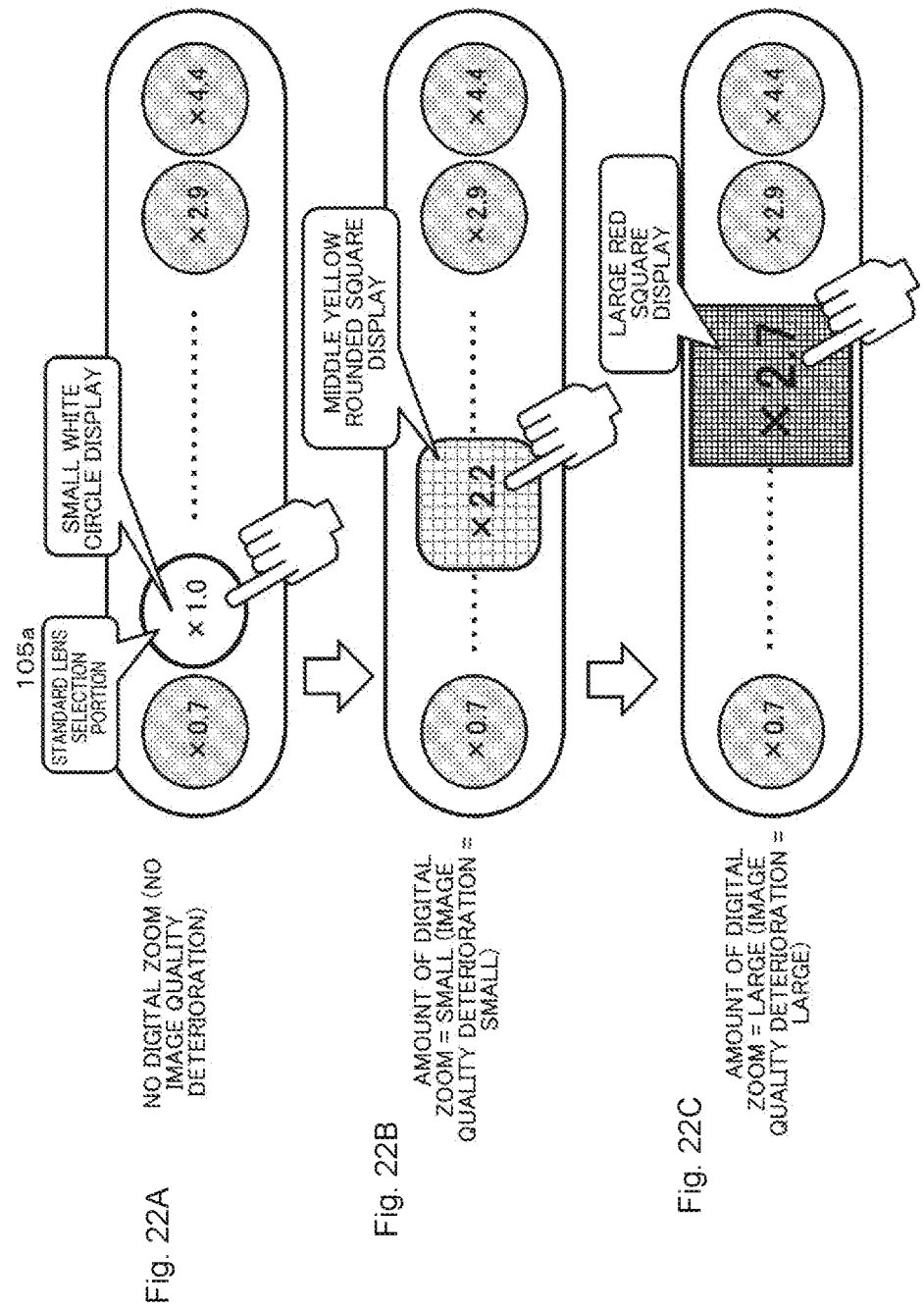
FIGS. 22A, 22B, and 22C are diagrams illustrating a specific example of display data for notifying the user of deterioration of image quality due to the digital zoom processing.

Further, as illustrated in FIGS. 22A, 22B, and 22C, a configuration that performs display control for changing the size of the standard lens selection portion 105a, in addition to the change in the color and shape of the output light of the standard lens selection portion 105a.

In FIGS. 22A, 22B, and 22C, the following three states are also illustrated.

FIG. 22A is a state in which the standard lens selection portion 105a has been set to the left end position (lens magnification=1.0) of the slide section.

FIG. 22B is a state in which the standard lens selection portion 105a is slid from the left end position (lens magnification=1.0) to the right and moved to approximately a center of the slide section.

FIG. 22C is a state in which the standard lens selection portion 105a has been further slid to the right and moved approximately to the right end of the slide section.

In the state FIG. 22A, the output light of the standard lens selection portion 105a is set to white.

The output light of the standard lens selection portion 105a is set to white so that the user is notified that the digital zoom amount is 0 and image quality is not degraded.

This display control processing is the same display control processing as in FIG. 20A.

In the state FIG. 22B, the output light of the standard lens selection portion 105a is set to yellow, the shape thereof is set to the rounded square shape, and a size of the standard lens selection portion 105a is increased.

In the state FIG. 22C, the output light of the standard lens selection portion 105a is set to red, the shape thereof is changed to a square shape, and the size of the standard lens selection portion 105a is made larger than in the state FIG. 22B.

The example illustrated in FIGS. 22A, 22B, and 22C shows a configuration that performs display control processing for changing the size of the standard lens selection portion 105a, in addition to the change in the color and shape of the output light of the standard lens selection portion 105a.

Such display control is performed so that it becomes possible to notify the user of the digital zoom amount or the deterioration of the image quality level depending on the slide amount of the lens selection portion 105 in an easy-to-understand manner.

Figure 23:
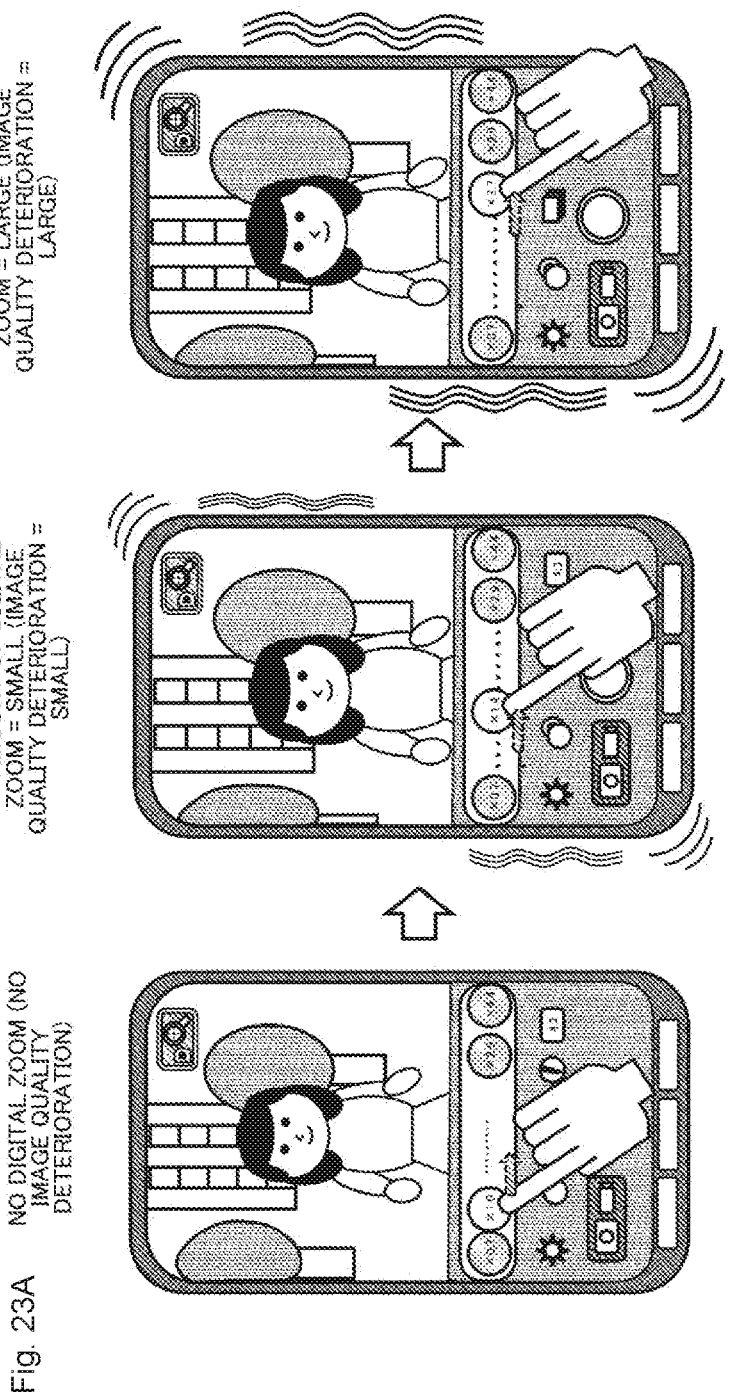
FIGS. 23A, 23B, and 23C are diagrams illustrating a specific example of notifying the user of deterioration of image quality due to digital zoom processing.

Further, a configuration that performs a notification using vibration as illustrated in FIGS. 23A, 23B, and 23C may be adopted.

In FIGS. 23A, 23B, and 23C, the following three states are also illustrated.

FIG. 23A is a state in which the standard lens selection portion 105a has been set to the left end position (lens magnification=1.0) of the slide section.

FIG. 23B is a state in which the standard lens selection portion 105a is slid from the left end position (lens magnification=1.0) to the right and moved to approximately a center of the slide section.

FIG. 23C is a state in which the standard lens selection portion 105a has been further slid to the right and moved approximately to the right end of the slide section.

In the state FIG. 23A, vibration processing is not performed.

A vibration is not generated so that the user is notified that the digital zoom amount is 0 and image quality is not degraded.

In the state FIG. 23B, weak vibration is generated.

In the state FIG. 23C, strong vibration is generated.

Thus, the user is notified of the digital zoom amount or the deterioration of the image quality level depending on the slide amount of the lens selection portion 105 by control of the presence or absence and intensity of the vibration.

Figure 24:
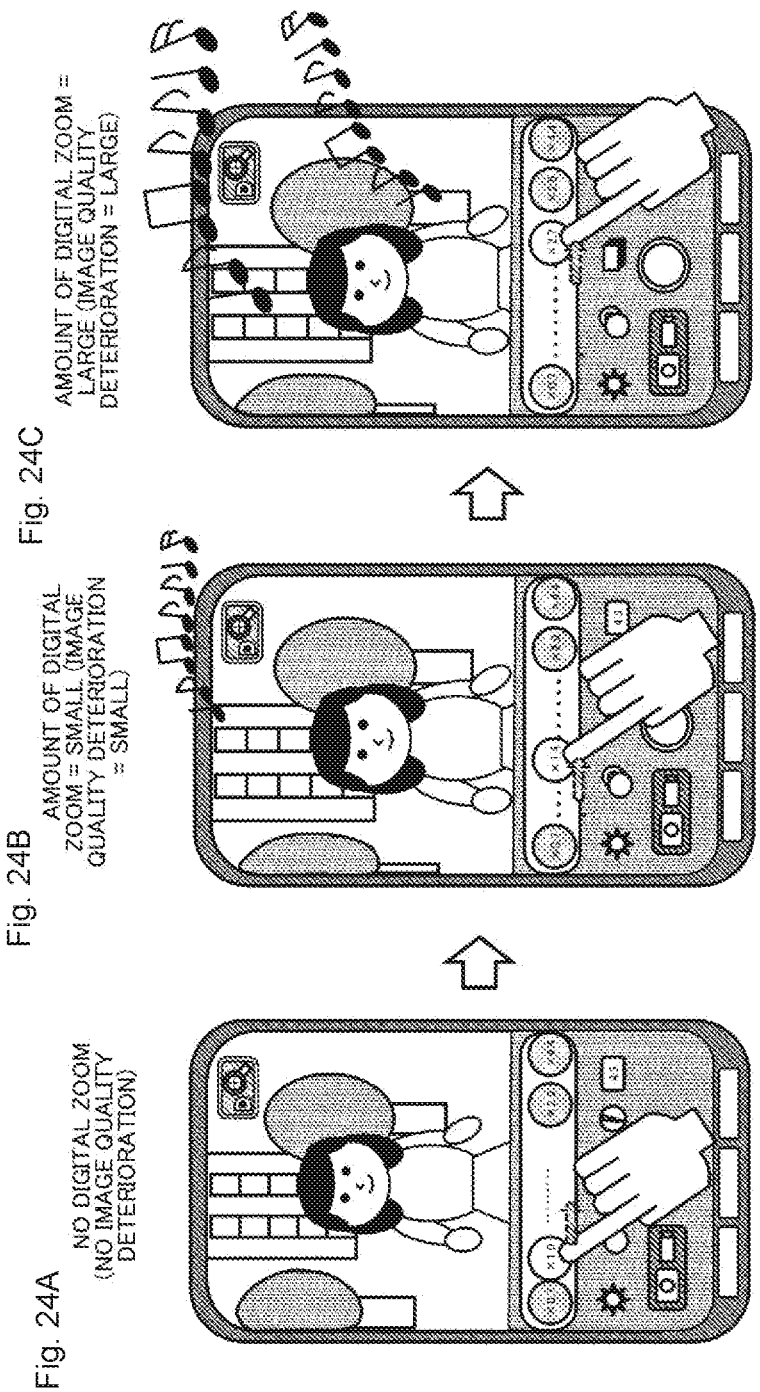
FIGS. 24A, 24B, and 24C are diagrams illustrating a specific example of notifying the user of deterioration of image quality due to digital zoom processing.

Further, a configuration in which a melody is output and a notification is performed as illustrated in FIGS. 24A, 24B, and 24C may be adopted.

In FIGS. 24A, 24B, and 24C, the following three states are also illustrated.

FIG. 24A is a state in which the standard lens selection portion 105a has been set to the left end position (lens magnification=1.0) of the slide section.

FIG. 24B is a state in which the standard lens selection portion 105a is slid from the left end position (lens magnification=1.0) to the right and moved to approximately a center of the slide section.

FIG. 24C is a state in which the standard lens selection portion 105a has been further slid to the right and moved approximately to the right end of the slide section.

In the state FIG. 24A, melody output processing is not performed.

The melody output is not performed so that the user is notified that the digital zoom amount is 0 and the image quality is not degraded.

In the state FIG. 24B, a weaker melody is output.

In the state FIG. 24C, a strong melody is output.

Thus, the user is notified of the digital zoom amount or the deterioration of the image quality level depending on the slide amount of the lens selection portion 105 by control of the presence or absence of the melody output and the intensity of an output sound.

5. OTHER EXAMPLES OF DISPLAY CONTROL PROCESSING

Next, other display control processing examples different from the above-described embodiment will be described.

Four display control processing examples shown below will be sequentially described.
- (a) An example of processing for displaying an icon for digital zoom adjustment independent from the lens selection portion so that the icon is available
- (b) An example of processing for outputting a message indicating that the digital zoom is in an ON state
- (c) An example of processing for displaying the slide section independent of the lens selection portion so that the slide section is available
- (d) An example of processing for displaying a zoom adjustment section in an apparatus having a configuration capable of optical zooming ((a) an Example of Processing for Displaying an Icon for Digital Zoom Adjustment Independent from the Lens Selection Portion so that the Icon is Available)

First, "(a) an example of processing for displaying an icon for digital zoom adjustment independent from the lens selection portion so that the icon is available" will be described with reference to FIG. 25.

Figure 25:
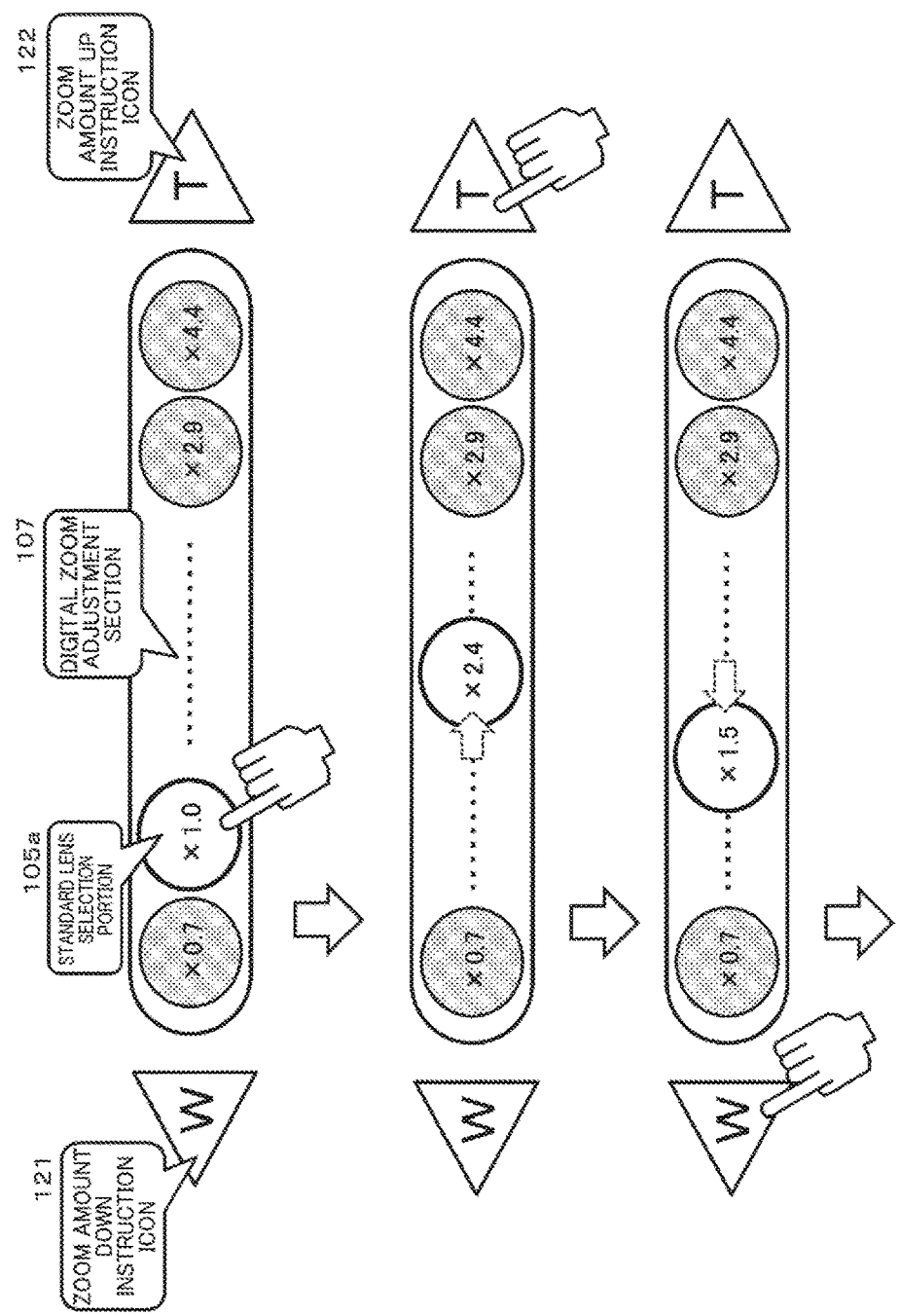
FIG. 25 is a diagram illustrating an example of the display data of an operation portion (UI portion).

As illustrated in FIG. 25, the lens selection portion 105 displays the slidable digital zoom adjustment section 107, and displays a zoom amount down instruction icon (W) 121 for decreasing the digital zoom amount and a zoom amount up instruction icon (T) 122 for increasing the digital zoom amount on the left and right of the digital zoom adjustment section 107. "W" denotes "wide" and "T" denotes "tele".

The user can also adjust the digital zoom amount by sliding the lens selection portion 105 within the digital zoom adjustment section 107, but the user can adjust the digital zoom amount by touching the zoom amount down instruction icon (W) 121 or the zoom amount up instruction icon (T) 122.

When the user touches the zoom amount down instruction icon (W) 121, the lens selection portion 105 can be moved to the left within the digital zoom adjustment section 107 so that the digital zoom amount can be decreased.

Further, when the user touches zoom amount up instruction icon (T) 122, the lens selection portion 105 can be moved to the right within the digital zoom adjustment section 107 so that the digital zoom amount can be increased.

((b) an Example of Processing for Outputting a Message Indicating that the Digital Zoom is in an ON State)

Next, "(b) an example of processing for outputting a message indicating that the digital zoom is in an ON state" will be described with reference to FIG. 26.

Figure 26:
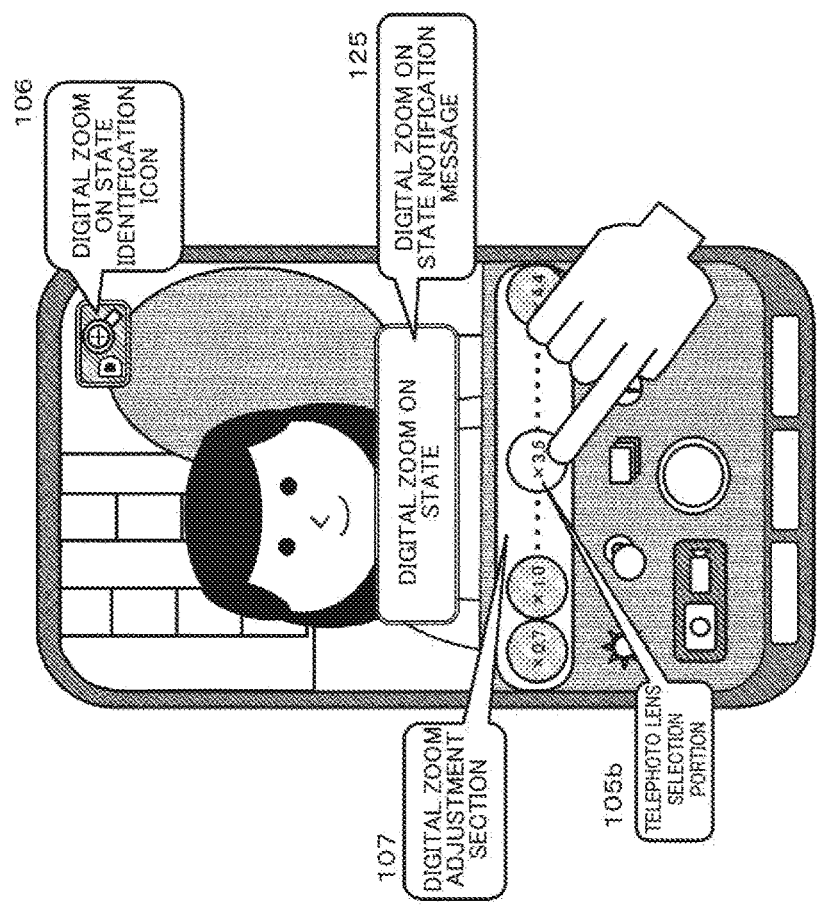
FIG. 26 is a diagram illustrating an example of the display data of the operation portion (UI portion).

When the data processing unit of the imaging apparatus 10 detects a user touch with respect to the lens selection portion (lens selection icon) 105, the data processing unit of the imaging apparatus 10 displays the digital zoom ON state identification icon 106 and displays the digital zoom adjustment section 107, as illustrated in FIG. 26.

Further, a digital zoom ON state notification message 125 is displayed.

The digital zoom ON state notification message 125 is, for example, a message such as
"Digital zoom is an ON state".

The user can reliably confirm a digital zoom processing situation from this message output.

((c) an Example of Processing for Displaying the Slide Section Independent of the Lens Selection Portion so that the Slide Section is Available)

Next, "(c) an example of processing for displaying the slide section independent of the lens selection portion so that the slide section is available" will be described with reference to FIG. 27.

Figure 27:
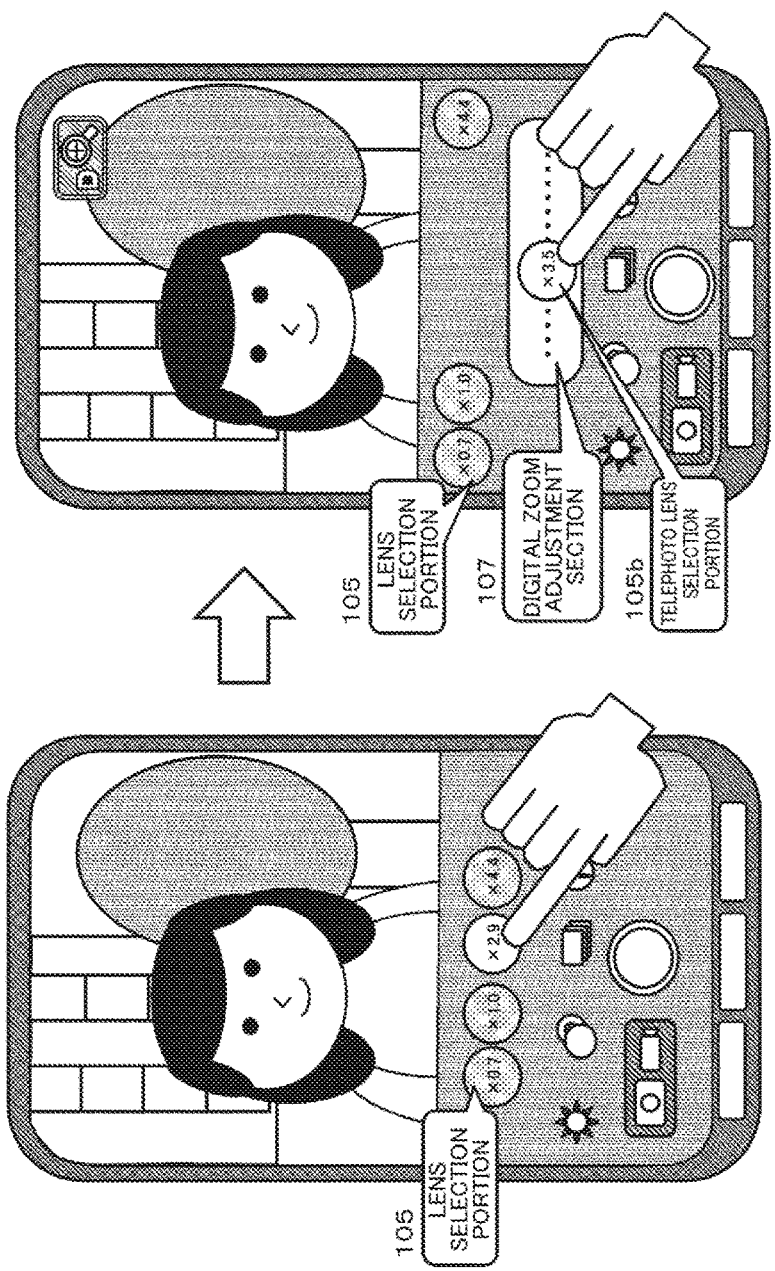
FIG. 27 is a diagram illustrating an example of the display data of the operation portion (UI portion).

When the data processing unit of the imaging apparatus 10 detects a user touch with respect to the lens selection portion (lens selection icon) 105, the data processing unit of the imaging apparatus 10 displays the digital zoom ON state identification icon 106 and displays the digital zoom adjustment section 107, as illustrated in FIG. 27.

However, in the present processing example, the lens selection portion (lens selection icon) 105 touched by the user and the digital zoom adjustment section 107 are displayed at positions different from the other lens selection portions (lens selection icons) 105, as illustrated in FIG. 27.

Such display processing enables the user to more clearly distinguish between and confirm a selected lens and a non-selected lens.

((d) an Example of Processing for Displaying a Zoom Adjustment Section in an Apparatus Having a Configuration Capable of Optical Zooming)

Next, an example of processing for displaying a zoom adjustment section in an apparatus having a configuration capable of optical zooming will be described.

In the above-described embodiments, the apparatus such as a smartphone having no zoom lens have been described. As described above, the apparatus such as a smartphone having no zoom lens performs digital zoom processing, for example, when the intermediate image between the image captured using the standard lens and the image captured using the telephoto lens is generated.

However, it becomes possible to achieve optical zooming with a configuration for bending an optical axis using a prism or the like even in a thin apparatus such as a smartphone. Specifically, it becomes possible to perform optical zooming even in the thin apparatus such as a smartphone by mounting a periscope type lens system (refractive optical system) having the configuration for bending an optical axis using a prism or the like.

For example, a configuration in which only one or two of the four types of lenses described in the above-described embodiment, that is, the wide-angle lens, the standard lens, the telephoto lens, and the super-telephoto lens are periscope type optical zoom lenses is assumed.

In the above-described embodiment, when the telephoto lens 12*c* with the lens magnification of 2.9 times is a periscope type optical zoom lens, it is possible to capture a clear image by the optical zooming without performing the digital zoom in an entire section corresponding to the lens magnification of 2.9 times to 4.4 times.

When a configuration capable of performing such optical zoom processing is adopted, it is preferable to perform a display for notifying the user that image capturing by the optical zooming is executed.

A display configuration that enables such notification will be described with reference to FIGS. 28A and 28B.

Figures 28A, 28B:
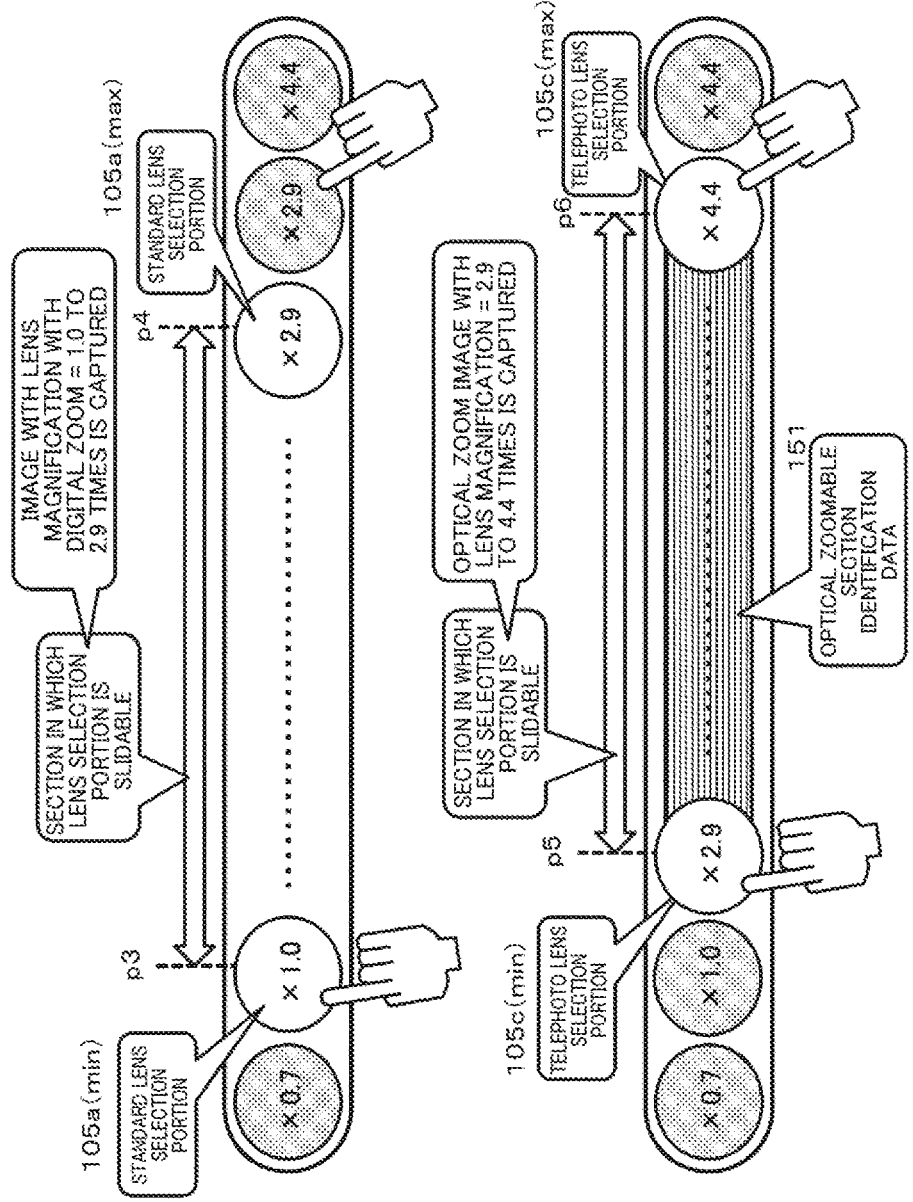
FIGS. 28A and 28B are diagrams illustrating an example of display data of an example unit (UI portion) in an apparatus capable of optical zooming.

FIGS. 28A and 28B illustrates display examples of the following two sections in which slidable is possible.

FIG. 28A Section in which the standard lens selection portion 105*a* is slidable FIG. 28B Section in which the telephoto lens selection portion 105*c* is slidable It is assumed that the standard lens 12*a* is not a periscope type optical zoom lens, but the telephoto lens 12*c* is a periscope type optical zoom lens and is capable of optical zooming.

In this case, the section (p3 to p4) in which the standard lens selection portion 105*a* is slidable, which is illustrated in FIG. 28A, is displayed as a digital zoom adjustment section in which a digital zoom image corresponding to a lens magnification of 1.0 times to 2.9 as described with reference to FIG. 14 can be captured.

On the other hand, an "optical zoomable section identification data 151" as illustrated in FIG. 28B is additionally displayed in a section in which the telephoto lens selection portion 105*c* corresponding to the telephoto lens 12*c*, which is a periscope type optical zoom lens and is capable of optical zooming, is slidable.

The user can view this "optical zoomable section identification data 151" and recognize that the clear image by the optical zooming is captured.

Figure 29:
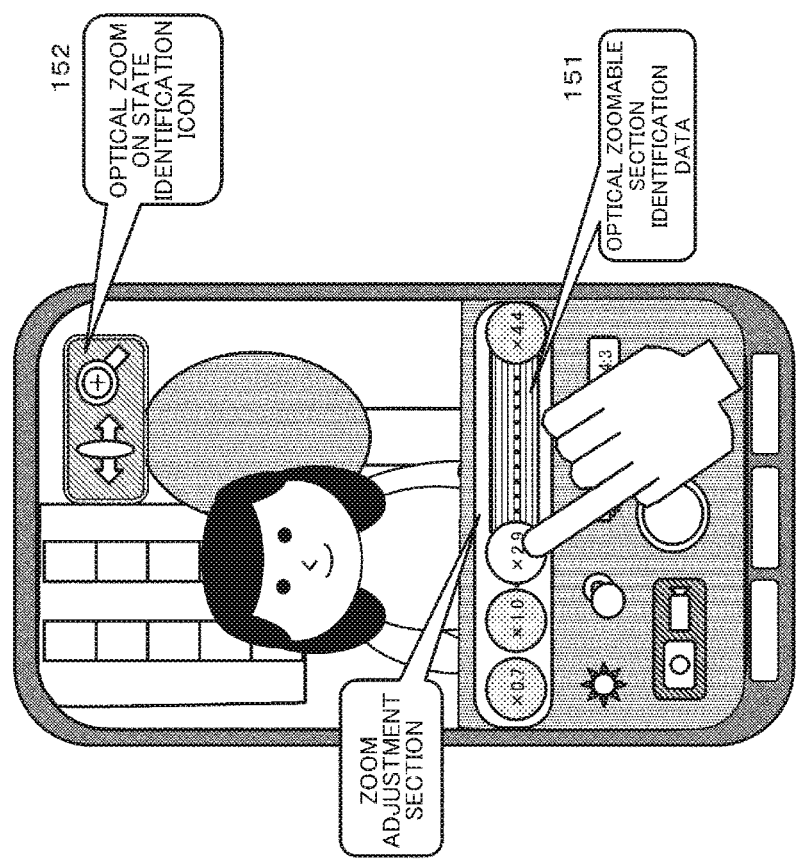
FIG. 29 is a diagram illustrating an example of display data of an example unit (UI portion) in an apparatus capable of optical zooming.

Further, an optical zoom ON state identification icon 152 may be displayed on the display unit 11 as illustrated in FIG. 29. The user can confirm the optical zoom ON state identification icon 152 to recognize that the clear image by the optical zooming is captured.

Although the example described with reference to FIGS. 28A, 28B, and 29 is a setting example in which the telephoto lens 12*c* is a lens capable of optical zooming, and the standard lens 12*a* is a lens incapable of optical zooming, the lens capable of optical zooming may be all or part of the lens.

For example, a configuration in which all lenses are optical zoomable lenses is also possible. In this case, the optical zoomable section identification data 151 as illustrated in FIG. 28B is displayed in an entire section in which the lens selection portion is slidable. Further, the optical zoom ON state identification icon 152 illustrated in FIG. 29 is also displayed.

Further, there is a configuration in which optical zooming is possible only at a point of a specific lens magnification even with a periscope type optical zoom lens. In the case of such a configuration, it is necessary to notify the user of a position at which the optical zooming is possible.

Figure 30:
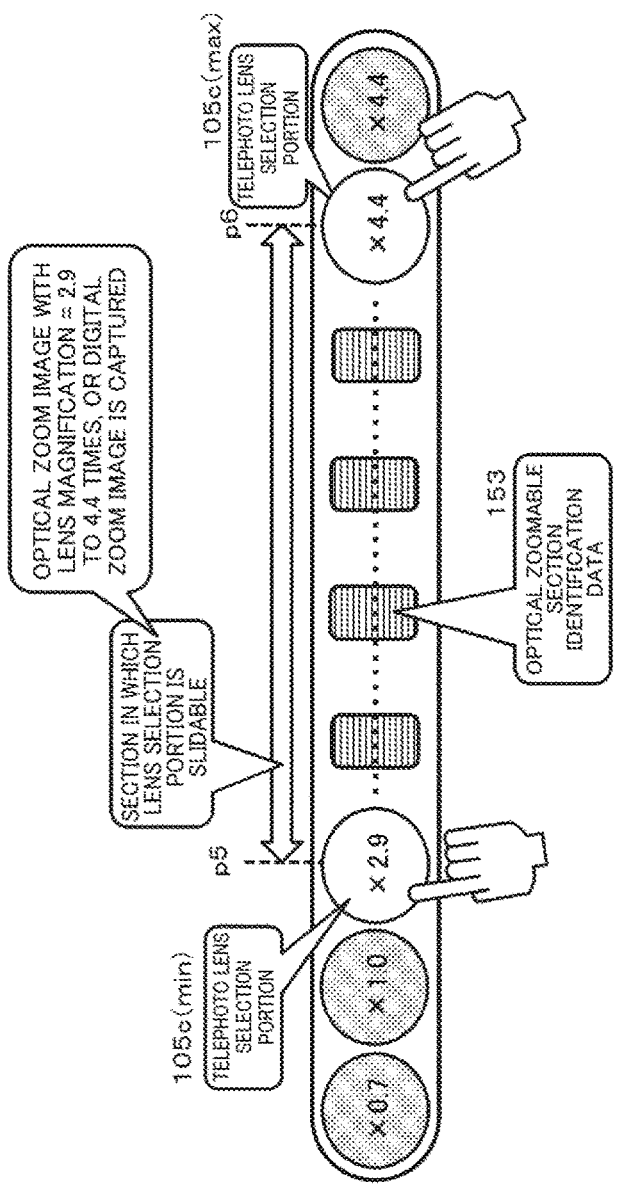
FIG. 30 is a diagram illustrating an example of display data of an example unit (UI portion) in an apparatus capable of optical zooming.

FIG. 30 is a diagram illustrating an example of display data capable of notifying the user of a position at which optical zooming is possible.

As illustrated in FIG. 30, a plurality of "optical zoomable section identification pieces of data 153" are displayed discretely in the section in which the telephoto lens selection portion 105*c* corresponding to the telephoto lens 12*c* capable of optical zooming is slidable only at a specific lens magnification point.

The user can view this "optical zoomable section identification data 153" and recognize that the clear image by the optical zooming is captured only at the plurality of positions.

Further, in this case, it is preferable to perform a setting so that either the digital zoom ON identification icon 106 or the optical zoom ON state identification icon 152 is displayed on the display unit 11 as illustrated in FIGS. 31A and 31B depending on a slide position of the telephoto lens selection portion 105*c*.

When the slide position of the telephoto lens selection portion 105*c* in the section in which the telephoto lens selection portion 105*c* is slidable is at an optical zoomable position, the optical zoom ON state identification icon 152 is displayed as illustrated in FIG. 31B.

On the other hand, when the slide position of the telephoto lens selection portion 105*c* is a position at which the optical zooming is not possible, the digital zoom ON state identification icon 106 is displayed as illustrated in FIG. 31A.

The user can reliably determine whether the zoom position is a zoom position at which image capturing by the optical zooming is executed or a zoom position at which an image capturing by the digital zoom is executed, depending on such display data.

Further, a case in which a display mode of the icon of the lens selection portion is changed when the lens selection portion is slid to the position at which optical zooming is possible may be adopted.

A specific example is illustrated in FIGS. 32A and 32B. FIGS. 32A and 32B illustrate the following two diagrams.

FIG. 32A Display data when the slide position of the telephoto lens selection portion 105*c* is a digital zoom position FIG. 32B Display data when the slide position of the telephoto lens selection portion 105*c* is an optical zoom position The telephoto lens selection portion display data in the case of FIG. 32A, that is, a case in which the slide position of the telephoto lens selection portion 105*c* is the digital zoom position is display data for the normal telephoto lens selection portion 105*c*.

On the other hand, the telephoto lens selection portion display data in the case of FIG. 32B, that is, a case in which the slide position of the telephoto lens selection portion 105*c* is the optical zoom position is display data different from the normal telephoto lens selection portion 105*c*.

That is, the display data is displayed as a telephoto lens selection portion with an optical zoomable position ancestor identification display 155.

Thus, a configuration in which a display mode of the lens selection portion is changed when the lens selection portion is slid to the position at which the optical zooming is possible may be adopted.

6. CONFIGURATION EXAMPLE OF IMAGING APPARATUS OF PRESENT DISCLOSURE

Next, a configuration example of the imaging apparatus of the present disclosure will be described.

The configuration example of the imaging apparatus of the present disclosure will be described with reference to FIG. 33.

Figure 33:
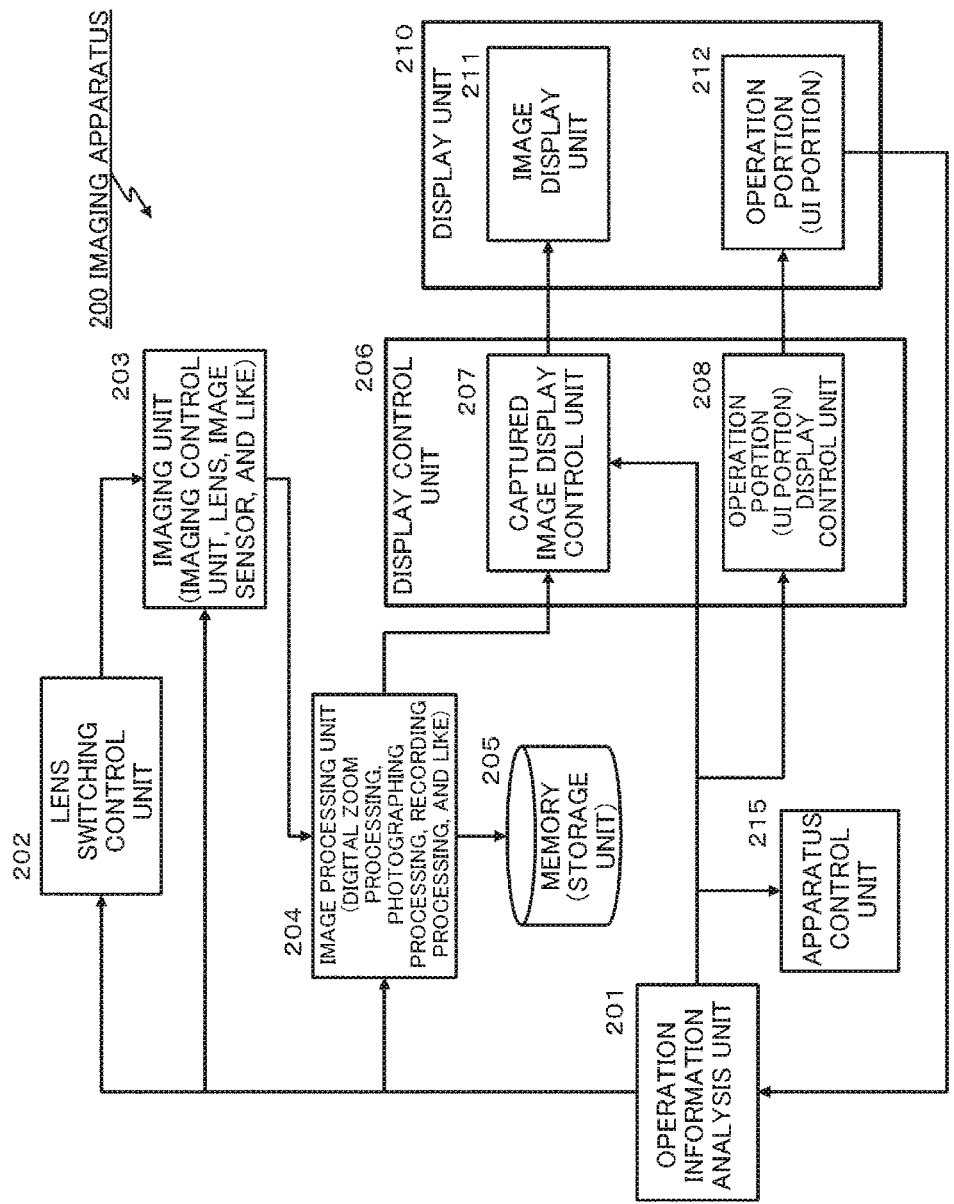
FIG. 33 is a diagram illustrating a configuration example of the imaging apparatus of the present disclosure.

An imaging apparatus 200 illustrated in FIG. 33 corresponds to the imaging apparatus 10 described in the above embodiment.

As illustrated in FIG. 33, the imaging apparatus 200 includes an operation information analysis unit 201, a lens switching control unit 202, an imaging unit 203, an image processing unit 204, a memory (storage unit) 205, a display control unit 206, a display unit 210, and an apparatus control unit 215.

The display control unit 206 includes a captured image display control unit 207 and an operation portion (UI portion) display control unit 208.

Further, the display unit 210 includes an image display unit 211 and an operation portion (UI portion) display unit 212.

The operation information analysis unit 201 analyzes a user operation with respect to the operation portion (UI portion) display unit 212 displayed on the display unit 210.

For example, the operation information analysis unit 201 detects and analyzes the touch processing or the slide processing for the lens selection portion (lens selection icon)

105, and the touch processing with respect to the shutter 103 described in the previous embodiment.

User operation information analyzed by the operation information analysis unit 201 is output to the lens switching control unit 202, the imaging unit 203, the image processing unit 204, the captured image display control unit 207, and the like depending on the analyzed user operation.

For example, when the analyzed user operation is detection of touch of the lens selection portion (lens selection icon) 105, information on the lens to be selected according to the touched lens selection portion (lens selection icon) 105 is output to the lens switching control unit 202.

Further, the operation portion (UI portion) display control unit 208 is notified that the touch of the lens selection portion (lens selection icon) 105 has been detected. The operation portion (UI portion) display control unit 208 executes, for example, processing for displaying the digital zoom ON state identification icon 106 or the digital zoom adjustment section 107 described in the previous embodiment on the display unit 210 in response to this notification of the detection of the touch of the lens selection portion (lens selection icon) 105.

When the user operation information analyzed by the operation information analysis unit 201 is detection of sliding of the lens selection portion (lens selection icon) 105, the slide amount is analyzed, and the image processing unit 204 is notified of an analysis result.

The image processing unit 204 determines the digital zoom amount depending on the slide amount input from the operation information analysis unit 201, and executes image area selection processing from the captured image input from the imaging unit 203 or image enlargement processing for a selection area depending on the determined digital zoom amount.

The digital zoom image generated by the image processing unit 204 is output to and displayed on the image display unit 211 of the display unit 210 via the captured image display control unit 207.

Further, when the user operation information analyzed by the operation information analysis unit 201 is a shutter operation, the image processing unit 204 is notified that the shutter operation has been performed.

The image processing unit 204 stores the image captured by the imaging unit 203 or a digital zoom processing image thereof in the memory (storage unit) 205 in response to such a shutter operation detection notification.

The lens switching control unit 202 receives information on the lens selection portion (lens selection icon) touched by the user from the operation information analysis unit 201, and executes processing for switching between lenses to be applied to photographing depending on the input information, as described above.

The imaging unit 203 is configured of an imaging control unit, a plurality of lenses, an image sensor, and the like. A lens to be applied to photographing is changed in response to a lens switching control command input from the lens switching control unit 202, and the captured image is output to the image processing unit 204.

The image processing unit 204 performs image processing on the captured image input from the imaging unit 203, outputs a processed image to the captured image display control unit 207, and causes the processed image to be displayed on the image display unit 211 of the display unit 210.

When the slide information of the lens selection portion (lens selection icon) 105 is input from the operation information analysis unit 201, the image processing unit 204 determines the digital zoom amount depending on the slide amount, and executes the image area selection processing from the captured image input from the imaging unit 203 or the image enlargement processing for the selected area depending on the determined digital zoom amount.

Further, when shutter operation information is input from the operation information analysis unit 201, the image processing unit 204 stores the image captured by the imaging unit 203 or the digital zoom processing image thereof in the memory (storage unit) 205.

The captured image display control unit 207 outputs the captured image received from the imaging unit 203 by the image processing unit 204 or the digital zoom processing image generated on the basis of the captured image received from the imaging unit 203 by the image processing unit 204 to the image display unit 211 of the display unit 210 to display the image.

The memory (storage unit) 205 records the captured image received from the imaging unit 203 by the image processing unit 204 or the digital zoom processing image generated on the basis of the captured image received from the imaging unit 203 by the image processing unit 204.

The memory (storage unit) 205 also stores programs for processing executed in the imaging apparatus 200, parameters used for various types of processing, and the like.

The operation portion (UI portion) display control unit 208 executes display control for data to be displayed in the operation portion display area 102 described in the previous embodiment.

For example, when the operation information analysis unit 201 notifies that the touch processing with respect to the lens selection portion (lens selection icon) 105 by the user has been detected, the operation portion (UI portion) display control unit 208 executes processing of displaying the digital zoom ON state identification icon 106 or the digital zoom adjustment section 107 described in the previous embodiment on the display unit 210 in response to this touch detection notification.

The operation portion (UI portion) display control unit 208 further executes display control for changing at least one of the output color, shape, and size of the lens selection portion that is slid by the user, depending on the slide amount.

The image display unit 211 of the display unit 210 corresponds to the captured image display area 101 described in the previous embodiment, and displays the captured image of the imaging unit 203 or the digital zoom processing image generated by the image processing unit 204.

The operation portion (UI portion) display unit 212 of the display unit 210 corresponds to the operation portion display area 102 described in the previous embodiment, and displays an operation portion (UI operation) such as the lens selection portion (lens selection icon) 105, the digital zoom adjustment section 107, and the shutter 103.

The apparatus control unit 215 executes, for example, vibration processing with an intensity corresponding to the slide amount of the lens selection portion (lens selection icon) 105 by the user, music output processing, or the like.

7. HARDWARE CONFIGURATION EXAMPLE OF IMAGING APPARATUS

First, the imaging apparatus of the present disclosure can be configured of, for example, a smartphone, a tablet terminal, or a PC having a camera function.

Figure 34:
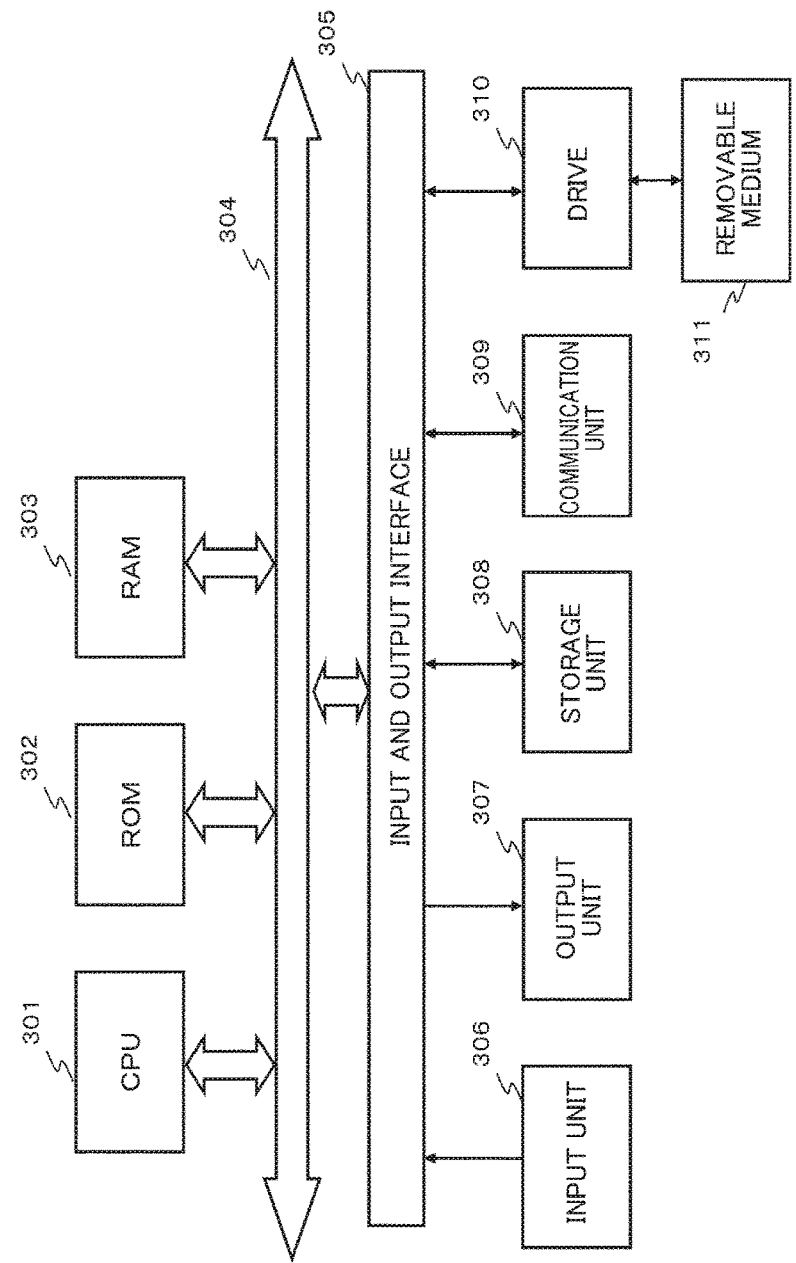
FIG. 34 is a diagram illustrating a hardware configuration example of the imaging apparatus of the present disclosure.

A hardware configuration example of the smartphone, the tablet terminal, or the PC, which is an example of the imaging apparatus of the present disclosure, will be described with reference to FIG. 34. The hardware illustrated in FIG. 34 is one configuration example of specific hardware of the imaging apparatus of the present disclosure.

A central processing unit (CPU) 301 functions as a control unit or a data processing unit that executes various types of processing according to programs stored in a read only memory (ROM) 302 or a storage unit 308. For example, the processing according to the sequence described in the above embodiment is executed. A random access memory (RAM) 303 stores a program that is executed by the CPU 301 or data. The CPU 301, the ROM 302, and the RAM 303 are connected to each other by a bus 304.

The CPU 301 is connected to an input and output interface 305 via the bus 304, and an input unit 306 including a camera, various switches, microphones, sensors, and the like, and an output unit 307 including a display, speakers, and the like are connected to the input and output interface 305.

The CPU 301 executes various types of processing in response to a command input from the input unit 306 and outputs processing results to the output unit 307, for example.

A storage unit 308 connected to the input and output interface 305 is configured of, for example, a flash memory, and stores a program executed by the CPU 301 or various types of data. A communication unit 309 includes a proximity communication unit such as NFC, or a communication unit for Wi-Fi communication, Bluetooth (registered trademark) (BT) communication, and data communication via a network such as the Internet or a local area network, and performs communication with an external apparatus.

A drive 310 connected to the input and output interface 305 drives a removable medium 311 such as a magnetic disk, an optical disc, a magneto-optical disc, or a semiconductor memory such as a memory card to execute recording or reading of data.

8. CONCLUSION OF CONFIGURATION OF PRESENT DISCLOSURE

Embodiments of the present disclosure have been described in detail above with reference to specific embodiments. However, it is obvious that those skilled in the art can modify or replace the embodiments without departing from the gist of this disclosure. That is, the present invention has been disclosed in the form of examples and should not be construed in a limiting manner. In order to determine the gist of the present disclosure, Claims should be considered.

Further, the technology disclosed in the present specification can have the following configurations.

(1) An imaging apparatus including:
a plurality of lenses available for image capture; and
a display control unit configured to execute control of display data to be output to a display unit,
wherein the display control unit
displays a plurality of lens selection portions corresponding to the plurality of respective lenses on a display unit, and
displays a digital zoom adjustment section in which a digital zoom amount of a captured image is adjustable depending on a slide amount of the lens selection portion selected by a user, in response to a user operation for selecting one of the plurality of lens selection portions displayed on the display unit.

(2) The imaging apparatus according to (1), wherein the plurality of lenses are lenses with different lens magnifications, and
the display control unit
displays a lens magnification corresponding to the lens selection portion in the lens selection portion.

(3) The imaging apparatus according to (1) or (2), wherein the display control unit sequentially changes and displays a lens magnification displayed in the lens selection portion when the user executes slide processing for the lens selection portion.

(4) The imaging apparatus according to any of (1) to (3), wherein the display control unit
displays, in the lens selection portion, a virtual lens magnification enabling capturing of an image after digital zoom processing for the captured image executed depending on the slide amount of the lens selection portion when the user executes slide processing for the lens selection portion.

(5) The imaging apparatus according to any of (1) to (4), wherein the display control unit
outputs an image captured using a lens corresponding to the lens selection portion selected by the user to the display unit in response to the user operation for selecting one of the plurality of lens selection portions displayed on the display unit.

(6) The imaging apparatus according to any of (1) to (5), wherein the display control unit outputs
an image after digital zoom processing for the captured image executed depending on the slide amount of the lens selection portion to the display unit when the user executes slide processing for the lens selection portion.

(7) The imaging apparatus according to any of (1) to (6), further including:
a lens switching control unit configured to set a lens corresponding to the lens selection portion selected by the user as a lens to be applied to photographing processing in response to the user operation for selecting one of the plurality of lens selection portions displayed on the display unit.

(8) The imaging apparatus according to any of (1) to (7), further including:
an image processing unit configured to execute digital zoom processing for the captured image depending on the slide amount of the lens selection portion when the user executes slide processing for the lens selection portion.

(9) The imaging apparatus according to (8), wherein the display control unit displays a digital zoom processing image of the captured image generated by the image processing unit on the display unit.

(10) The imaging apparatus according to any of (1) to (9), wherein the display control unit
executes display control for notifying the user of deterioration of image quality caused by digital zoom processing for the captured image executed depending on the slide amount of the lens selection portion when the user executes slide processing for the lens selection portion.

(11) The imaging apparatus according to (10), wherein the display control unit executes display control for changing at least one of an output color, shape, and size of the lens selection portion that is slid by the user, depending on the slide amount, as display control for notifying the user of the deterioration of the image quality caused by digital zoom processing for the captured image.

(12) The imaging apparatus according to any of (1) to (11),
wherein an apparatus control unit executes vibration processing with intensity according to the slide amount of the lens selection portion, or music output processing with intensity according to the slide amount of the lens selection portion, as display control for notifying the user of deterioration of image quality caused by digital zoom processing for the captured image.

(13) An imaging apparatus control method executed in an imaging apparatus, wherein the imaging apparatus includes
a plurality of lenses available for image capture; and
a display control unit configured to execute control of display data to be output to a display unit,
wherein the display control unit
displays a plurality of lens selection portions corresponding to the plurality of respective lenses on a display unit, and
displays a digital zoom adjustment section in which a digital zoom amount of a captured image is adjustable depending on a slide amount of the lens selection portion selected by a user, in response to a user operation for selecting one of the plurality of lens selection portions displayed on the display unit.

(14) A program for causing imaging apparatus control processing to be executed in an imaging apparatus,
wherein the imaging apparatus includes
a plurality of lenses available for image capture; and
a display control unit configured to execute control of display data to be output to a display unit, and
the program causes the display control unit to execute
processing for displaying a plurality of lens selection portions corresponding to the plurality of respective lenses on a display unit, and
processing for displaying a digital zoom adjustment section in which a digital zoom amount of a captured image is adjustable depending on a slide amount of the lens selection portion selected by a user, in response to a user operation for selecting one of the plurality of lens selection portions displayed on the display unit.

Further, a series of processing described in the specification can be executed by hardware, software, or a composite configuration of both. When processing is executed by software, a program in which a processing sequence is recorded can be installed in a memory of a computer built into dedicated hardware and executed, or the program can be installed and executed in a general-purpose computer capable of executing various processing. For example, the program can be recorded on a recording medium in advance. In addition to being installed in a computer from a recording medium, the program can be received via a network such as a local area network (LAN) or the Internet and installed in a recording medium such as an embedded hard disk.

Various processing described in the specification may not only be executed in chronological order according to the description, but may also be executed in parallel or individually according to processing capability of a device that executes the processing or as necessary. Further, in the present specification, the system is a logical collective configuration of a plurality of devices, and the devices of the respective configuration are not limited to being in the same housing.

INDUSTRIAL APPLICABILITY

As described above, according to the configuration of the embodiment of the present disclosure, the operation portion (UI) that enables efficient execution of the photographing lens selection processing by the user and the digital zoom processing for the captured image using the selected lens is realized.

Specifically, for example, a plurality of lenses with different lens magnifications available for image capturing, and a display control unit configured to execute control of display data to be output to a display unit are included, and the display control unit displays a plurality of lens selection portions corresponding to the plurality of respective lenses on the display unit, displays a digital zoom adjustment section in which a digital zoom amount of a captured image is adjustable depending on a slide amount of the lens selection portion selected by a user, in response to a user operation for selecting one of the plurality of lens selection portions displayed on the display unit, and displays a digital zoom image executed depending on the slide amount on the display unit.

With this configuration, the operation portion (UI) that enables efficient execution of the photographing lens selection processing by the user and the digital zoom processing for the captured image using the selected lens is realized.

REFERENCE SIGNS LIST

10 Imaging apparatus
11 Display unit
12 Camera lens
101 Captured image display area
102 Operation portion display area
103 Shutter
104 Still image/moving image switching unit
105 Lens selection portion (lens selection icon)
106 Digital zoom ON state identification icon
107 Digital zoom adjustment section
121 Zoom amount down instruction icon
122 Zoom amount up instruction icon
125 Digital zoom ON state notification message
151 Optical zoomable section identification data
152 Optical zoom ON state identification icon
153 Optical zoomable section identification data
200 Imaging apparatus
201 Operation information analysis unit
202 Lens switching control unit
203 Imaging unit
204 Image processing unit
205 Memory (storage unit)
206 Display control unit
207 Captured image display control unit
208 Operation portion (UI portion) display control unit
210 Display unit
211 Image display unit
212 Operation portion (UI portion) display unit
215 Apparatus control unit
301 CPU
302 ROM
303 RAM
304 Bus
305 Input and output interface
306 Input unit
307 Output unit
308 Storage unit
309 Communication unit
310 Drive
311 Removable medium

The invention claimed is:

1. An imaging apparatus comprising:
a plurality of lenses for an image capture process; and
a display control unit configured to:
execute control of display data to be output to a display unit,
display a plurality of lens selection portions corresponding to the plurality of lenses on the display unit; and
display a digital zoom adjustment section in which a digital zoom amount of a captured image is adjustable based on a slide amount of a lens selection portion from the plurality of lens selection portions selected by a user, in response to a user operation for selection of the lens selection portion of the plurality of lens selection portions displayed on the display unit.

2. The imaging apparatus according to claim 1, wherein the plurality of lenses are lenses with different lens magnifications, and
the display control unit is further configured to display, in the lens selection portion, a lens magnification corresponding to the lens selection portion.

3. The imaging apparatus according to claim 1, wherein the display control unit is further configured to sequentially change and display a lens magnification displayed in the lens selection portion when the user executes a slide process for the lens selection portion.

4. The imaging apparatus according to claim 1, wherein the display control unit is further configured to display, in the lens selection portion, a virtual lens magnification that enables capturing of an image after a digital zoom process for the captured image executed depending on the slide amount of the lens selection portion when the user executes a slide process for the lens selection portion.

5. The imaging apparatus according to claim 1, wherein the display control unit is further configured to output an image captured by a lens corresponding to the lens selection portion selected by the user to the display unit in response to the user operation for selecting the lens selection portion of the plurality of lens selection portions displayed on the display unit.

6. The imaging apparatus according to claim 1, wherein the display control unit is further configured to output an image after a digital zoom process for the captured image executed depending on the slide amount of the lens selection portion to the display unit when the user executes a slide process for the lens selection portion.

7. The imaging apparatus according to claim 1, further comprising:
a lens switching control unit configured to set a lens corresponding to the lens selection portion selected by the user for a photographing process in response to the user operation for selecting the lens selection portion of the plurality of lens selection portions displayed on the display unit.

8. The imaging apparatus according to claim 1, further comprising:
an image processing unit configured to execute a digital zoom process for the captured image based on the slide amount of the lens selection portion when the user executes a slide process for the lens selection portion.

9. The imaging apparatus according to claim 8, wherein the display control unit is further configured to display a digital zoom processing image of the captured image generated by the image processing unit on the display unit.

10. The imaging apparatus according to claim 1, wherein the display control unit is further configured to execute display control to notify the user of a deterioration of an image quality caused by a digital zoom process for the captured image executed depending on the slide amount of the lens selection portion when the user executes a slide process for the lens selection portion.

11. The imaging apparatus according to claim 10, wherein the display control unit is further configured to execute display control to change at least one of an output color, a shape, or a size of the lens selection portion that is slid by the user, depending on the slide amount, as the display control to notify the user of the deterioration of the image quality caused by the digital zoom process for the captured image.

12. The imaging apparatus according to claim 1, wherein further comprising an apparatus control unit configured to execute one of a vibration process with an intensity associated with the slide amount of the lens selection portion, or a music output process with the intensity associated with the slide amount of the lens selection portion, as display control to notify the user of a deterioration of an image quality caused by a digital zoom process for the captured image.

13. An imaging apparatus control method, comprising:
in an imaging apparatus;
executing, by a display control unit, control of display data to be output to a display unit;
displaying a plurality of lens selection portions corresponding to a plurality of lenses on the display unit; and
displaying a digital zoom adjustment section in which a digital zoom amount of a captured image is adjustable based on a slide amount a lens selection portion from the plurality of lens selection portions selected by a user, in response to a user operation for selecting the lens selection portion of the plurality of lens selection portions displayed on the display unit.

14. A non-transitory computer-readable medium having stored thereon, computer-executable instructions which, when executed by a computer, cause the computer to execute operations. the operations comprising:
executing control of display data to be output to a display unit;
displaying a plurality of lens selection portions corresponding to a plurality of lenses on the display unit; and
displaying a digital zoom adjustment section in which a digital zoom amount of a captured image is adjustable based on a slide amount of a lens selection portion from the plurality of lens selection portions selected by a user, in response to a user operation for selecting the lens selection portion of the plurality of lens selection portions displayed on the display unit.

* * * * *